United States Patent
Yelon et al.

(10) Patent No.: US 6,415,317 B1
(45) Date of Patent: Jul. 2, 2002

(54) SOFTWARE SYSTEM FOR REDUCING THE APPEARANCE OF LATENCY IN A MULTI-USER ENVIRONMENT

(76) Inventors: Joshua Michael Yelon, 2129 Wightman Rd., Pittsburgh, PA (US) 15220; Andrew Lewis Tepper, 320 Sunset Dr., Pittsburgh, PA (US) 15235

( * ) Notice: Subject to any disclaimer, the term of this patent is extended or adjusted under 35 U.S.C. 154(b) by 0 days.

(21) Appl. No.: 09/410,894

(22) Filed: Oct. 1, 1999

(51) Int. Cl.$^7$ ............................................. G06F 13/00
(52) U.S. Cl. ........................ 709/205; 709/1; 709/313; 709/329; 395/500.28
(58) Field of Search ........................... 709/1, 203, 204, 709/205, 217, 218, 219, 313, 328, 329; 395/500.28

(56) References Cited

U.S. PATENT DOCUMENTS

| | | | |
|---|---|---|---|
| 4,570,930 A | | 2/1986 | Matheson ................. 273/1 E |
| 5,586,257 A | | 12/1996 | Perlman ...................... 463/42 |
| 5,623,642 A | * | 4/1997 | Katz et al. ............. 395/500.27 |
| 5,695,400 A | | 12/1997 | Fennell, Jr. et al. .......... 463/42 |
| 5,802,292 A | | 9/1998 | Mogul .................. 395/200.33 |
| 5,822,523 A | | 10/1998 | Rothschild et al. .... 395/200.17 |
| 5,832,467 A | * | 11/1998 | Wavish ........................ 706/11 |
| 5,838,909 A | | 11/1998 | Roy et al. .............. 395/200.39 |
| 5,841,980 A | | 11/1998 | Waters et al. .......... 395/200.34 |
| 5,899,810 A | | 5/1999 | Smith .......................... 463/42 |
| 5,933,125 A | * | 8/1999 | Fernie et al. ................. 345/8 |
| 6,118,456 A | * | 9/2000 | Cooper ....................... 345/433 |

OTHER PUBLICATIONS

Munkki, Juri; "Design and Implementation of Networked Games"; Dec. 17, 1997.

Aronson, Jesse; "Using a Predetermined Set of Algorithms to Extrapolate Entiy Behavior, You Can Hide Some of the Effects That Latency Has on Fast–Action Games", Printed Jul. 7, 1999.

(List continued on next page.)

Primary Examiner—Viet D. Vu
(74) Attorney, Agent, or Firm—Cohen & Grigsby, P.C.

(57) ABSTRACT

The present invention provides a software system used for transmission of information between multiple users interacting on a distributed computer network such as the Internet. The system comprises a central server computer connected to a plurality of client computers by means of a communication network such as the Internet. The server authoritatively models the state of the virtual environment in which the users interact. To eliminate latency each client predictively models the state of the virtual environment before the client is made aware by the server of commands issued by other users. Each command issued by a user is forwarded to the server. The client does not wait for the server to send back a response. Instead the client updates its own predictive model of the virtual environment to reflect the effects of the command it sent to the server. It displays these effects immediately thereby eliminating the latency in transmission between server and client. When the central server receives the command it updates its authoritative master model of the state of the virtual environment to reflect the effects of the command. Then the server separately or compares its master computation with the client's predictive computation to resolve any inaccuracies that may exist in the client's model. If the server judges these inaccuracies to be significant it sends a list of corrections to the client which are incorporated into the client's predictive model. If the client's predictive model of the virtual environment is kept close to the true state of the server's master model the client's computations will be acceptably accurate. Because the client displays these results immediately and then the true results when the server's corrections arrive the human perception is that the game is responding instantly with the required accuracy.

26 Claims, 16 Drawing Sheets

OTHER PUBLICATIONS

O'Brien, Larry; "Using Two Games as an Example, O'Brien Examines the Implication of Creating a Turn–Based Vs. A Real–Time Game, and Shows How to Calculate Optimal Time and Space Granularities For a Game", Printed Jul. 7, 1999.

Cotton, Jay; "Multiplayer Game Writer's FAQ Version 0.9"; Copyright 1996 Kali, Inc.

Ramskov, Jakob; article dated Jul. 7, 1999 10:29 AM; beginning "When Quake World was released . . . ".

author unknown; article dated Jul. 7, 1999; beginning "Virtual Environments (VEs) are inactive . . . ".

* cited by examiner

SOFTWARE SYSTEM FOR REDUCING THE APPEARANCE OF LATENCY IN A MULTI-USER ENVIRONMENT

FIELD OF THE INVENTION

The present invention relates to a software system for representing user activity in a multi-user, multi-location and multi-tasking virtual interactive environment, and in particular to a software system designed to provide a multi-user interactive game and more particularly such a game which may be played between distributed users interconnected with a host computer through a data communication network having appreciable latency, such as the Internet.

COMPUTER PROGRAM LISTING APPENDIX

A computer program listing appendix entitled "Appendices A–E to Ser. No. 09/410,894" and contained on a compact disc is included as part of this specification and incorporated by reference herein in its entirety.

BACKGROUND OF THE INVENTION

The market has shown considerable interest in computer games in which many players participate by use of the Internet. One of the primary complaints about these games is that they are "laggy," in other words, that they respond sluggishly and erratically when the user invokes a command due to inherent system latency created by the need to transmit information to and from the user to a central server which processes the information. This lag occurs because the player's computer cannot process the command and display the results until after it has consulted with a central server. The Internet makes such consultation slow. It has been predicted by many sources that the market for Internet games would expand dramatically if the lag problem could be solved.

A principal object of the present invention is to reduce the appearance of lag (or latency) in a multi-user computer network environment and in particular in an interactive game where users are connected to the server by means of a data communication network having significant and variable latency such as the Internet. To this end a novel architecture has been devised which enables the user (client) computer to display the results of the user's commands without waiting for a response from the central server.

SUMMARY OF THE INVENTION

The present invention provides a software system used for transmission of information between multiple users interacting on a distributed computer network such as the Internet. The system comprises a central server computer connected to a plurality of client computers by means of a communication network such as the Internet. The server authoritatively models the state of the virtual environment in which the users interact.

To eliminate latency each client predictively models the state of the virtual environment before the client is made aware by the server of commands issued by other users. Each command issued by a user is forwarded to the server. The client does not wait for the server to send back a response. Instead the client updates its own predictive model of the virtual environment to reflect the effects of the command it sent to the server. It displays these effects immediately thereby eliminating the latency in transmission between server and client. When the central server receives the command it updates its authoritative master model of the state of the virtual environment to reflect the effects of the command. Then the server separately duplicates the client's predictive computation to identify any inaccuracies that may exist in the client's model. If the server judges these inaccuracies to be significant it sends a list of corrections to the client which are incorporated into the client's predictive model. If the client's predictive model of the virtual environment is kept close to the true state of the server's master model the client's computations will be acceptably accurate. Because the client displays these results immediately and then the true results when the server's corrections arrive the human perception is that the game is responding instantly with the required accuracy.

Other advantages of the present invention will become apparent by a perusal of the following detailed description of a presently preferred embodiment of the invention taken in connection with the drawings.

BRIEF DESCRIPTION OF THE DETAILED DRAWINGS

DETAILED DESCRIPTION OF THE PREFERRED EMBODIMENTS

The present invention generally relates to a software system for representing user activity in a multi-user, multi-location and multi-tasking virtual environment, and provides a software system used for transmission of information between multiple users interacting on a distributed computer network such as the Internet. The system comprises a central server computer connected to a plurality of client computers by means of a communication network such as the Internet. A principal object of the present invention is to reduce the appearance of lag (or latency) in a multi-user computer network environment.

The presently preferred embodiment of the system is implemented in the form of a multi-user interactive game which may be played between distributed users interconnected with a host computer through a data communication network having appreciable latency, such as the Internet. The novel system architecture described below has been devised which enables the user (client) computer to display the results of the user's commands without waiting for a response from the central server.

The server authoritatively models the state of the virtual environment in which the users interact. To eliminate latency each client predictively models the state of the virtual environment before the client is made aware by the server of commands issued by other users. Each command issued by a user is forwarded to the server. The client does not wait for the server to send back a response. Instead the client updates its own predictive model of the virtual environment to reflect the effects of the command it sent to the server. It displays these effects immediately thereby eliminating the latency in transmission between server and client. When the central server receives the command it updates its authoritative master model of the state of the virtual environment to reflect the effects of the command. Then the server separately duplicates the client's predictive computation to identify any inaccuracies that may exist in the client's model. If the server judges these inaccuracies to be significant it sends a list of corrections to the client which are incorporated into the client's predictive model. If the client's predictive model of the virtual environment is kept close to the true state of the server's master model the client's computations will be acceptably accurate. Because the client displays these results immediately and then the true results when the server's corrections arrive the human perception is that the game is responding instantly with the required accuracy.

DETAILED DESCRIPTION OF THE PREFERRED HARDWARE ARCHITECTURE

Figure 1:
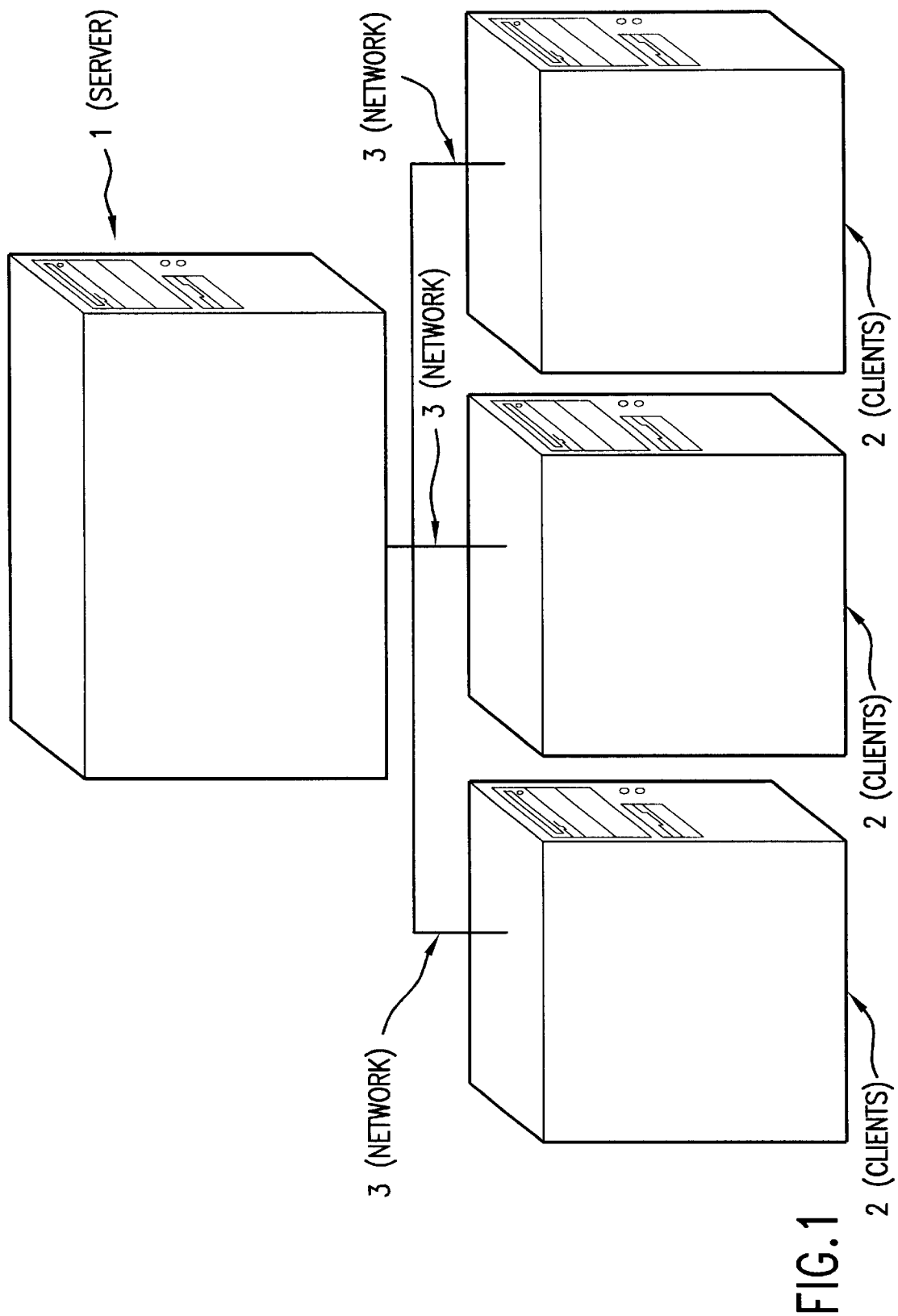
FIG. 1 is a block diagram of the system architecture necessary to implement the hardware and software configuration required for use of the present invention.

FIG. 1 shows the system as preferably implemented in a wide-area network (WAN) to connect conventional computer clients 2 to a central server 1. Each client 2 may be a conventional IBM Personal Computer (PC) or Intel Central Processing Unit (CPU)-based computer utilizing Microsoft Windows 95 or Windows NT, a computer from Apple Corporation such as the iMac, a computer utilizing Linux and the X Window System which may be based on the Intel, PowerPC, DEC Alpha, or any other CPU. Other architectures and operating systems may be used as well. The server 1 may be a conventional IBM Personal Computer (PC) or Intel Central Processing Unit (CPU)-based computer utilizing Microsoft Windows 95 or Windows NT, a conventional UNIX-based supercomputer such as a Cray X-MP, a parallel UNIX-based supercomputer such as a Cray T3E, Thinking Machines CM-5, or SGI Origin 2000. The server 1 may be assisted by other servers forming a bank of servers connected via Ethernet, an Asynchronous Transfer Mode (ATM)-switch, a Myrinet switch from Myricom, Inc, or other fast local interconnect, or via a long-distance interconnect such as an Internet OC3, OC12, or other high-speed Internet connection. Each client 2 must also be capable of communicating with the server 1 via the Internet 3 which requires a suitable connection to provide appropriate bandwidth and data transmission speed for use of the invention such as a 14.4 kbps telephone modem or better, and the server will need a connection to the Internet such as DSL (Digital Subscriber Line), T1, or T3. The preferred embodiment will support up to 50,000 players per virtual environment with up to 5,000 users concurrent and up to 1,000,000 user objects. The system requires on the order of 20 servers using of fast Pentium PCs or other microprocessors with equivalent central processing unit (CPU) capacity or an equivalent supercomputer to maintain this load. To maintain this load, the internal server-to-server network must support gigabit bandwidths with the server bank will be connected to the clients by one or more T3 lines. The system uses less than 14.4 kpbs per player, with the help of the present invention.

The server bank 1 writes a checkpoint file every few minutes with a master-control program to monitor the servers in detecting a hardware failure. If so detected the system will shut down the servers 1, isolate the hardware fault to the responsible client 2, reinitialize the other clients and restore the state of the virtual environment to the most recent retained checkpoint. This allows the system to accomplish damage control rapidly to minimize system downtime.

DETAILED DESCRIPTION OF THE PREFERRED SOFTWARE ARCHITECTURE

The server 1 and each client 2 must maintain in resident or nonresident memory a number of system "models" implemented by the software architecture described below which provide an all-inclusive description of the virtual environment in which the system operates. This virtual environment can range from a set of virtual objects having simple interrelationships defined by the users, such as card game involving a table with some cards, to an entire simulated world consisting of a landscape with varied terrain, objects such as trees and buildings, and creatures, vehicles, and individuals moving about the landscape. Each model contains an all-inclusive description of each item in the virtual environment. The descriptions of virtual objects modeled by the software not only include the appearance of the virtual object but also a description of how those virtual objects respond to stimuli (such as being pushed or spoken to); in other words the rules of the virtual environment.

I. The Contents of a Model

Figure 2:
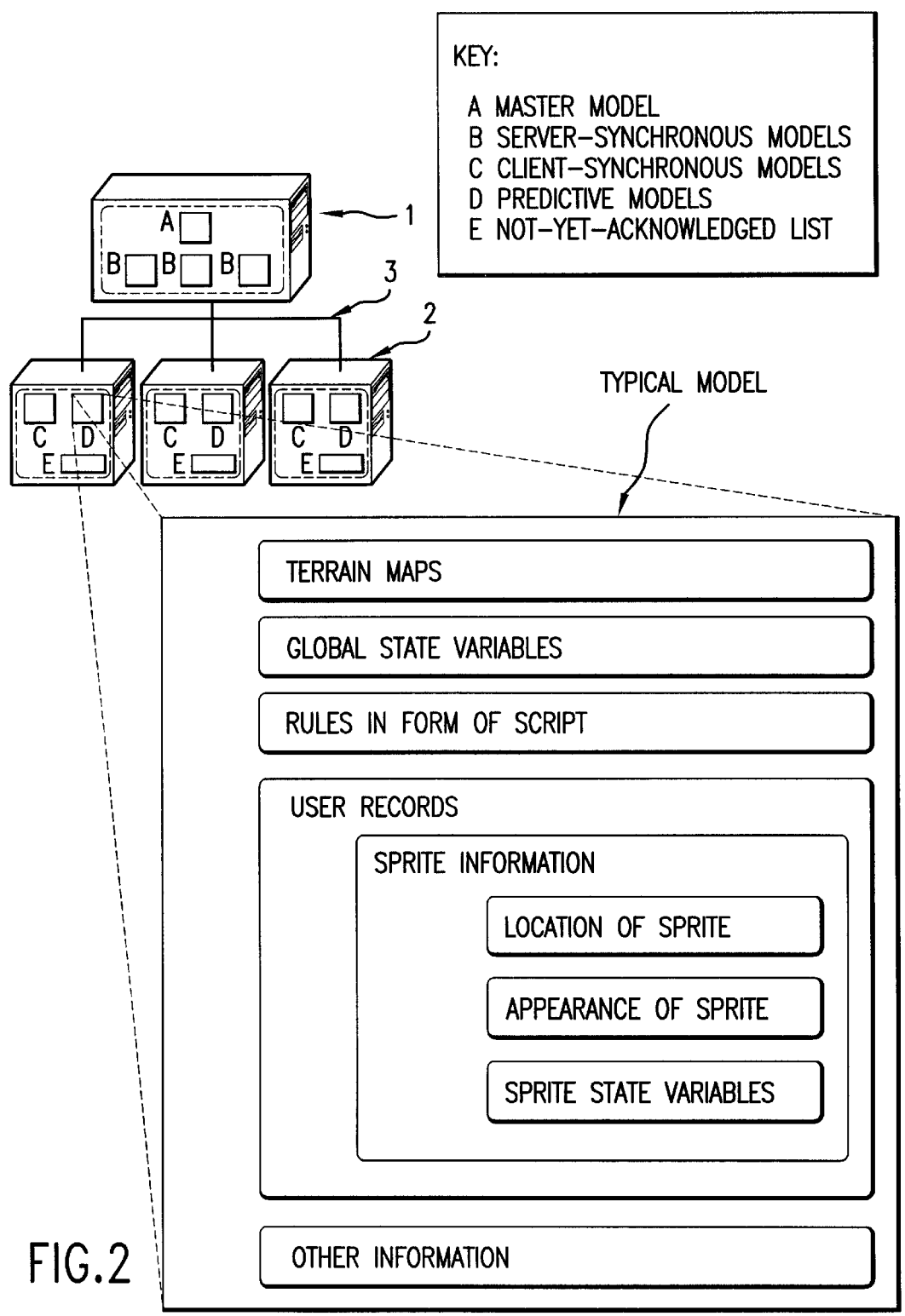
FIG. 2 shows the items of data that the server and client computers must store in order to implement the present invention.

Each model of the virtual environment stored within the memory of the server 1 and the clients 2 must include the necessary data structures to store all relevant information about the virtual environment. Such data structures will be manipulable by the system software at the user's command. Depending on the nature of the virtual environment data structures representing some or all of the following elements, as shown in FIG. 2, may be part of the model:

Terrain maps (terrain attributes and elevation, in a grid);

Global state variables;

User records;

Sprites;

"Rules" of the virtual environment in the form of a "script";

A "sprite map" (which allows ascertaining which virtual objects are present in a region).

Each sprite is a discrete visible object and in the preferred embodiment may be displayed using pre-rendered bitmaps or using animated polygon meshes. Each sprite data structure may include some or all of the following information:

Position (Plane, X,Y);

Type (an identifier, used by the scripting system);

Graphic (a string, used as the URL of an image file);

Sprite-local state variables;

A set of threads (activities that the sprite is performing);

Collectively this information in combination with any other information necessary to define the state of the environment as determined by the nature of the environment constitutes a model. The model is an all-inclusive definition of the state of the virtual environment which makes up the model.

II. The Predictive Reexecution Algorithm

As shown in FIG. 2, the presently preferred algorithm of the present invention utilizes several system models of the environment:

The master model A (located on server 1);

The server synchronized model B (located on server 1, one per client);

The client synchronized model C (located on each client 2);

The predictive model D (located on each client 2).

The master model A represents the true state of the virtual environment. It contains the basic information defining the status of all users, objects, and terrain features. The server synchronized model B represents the subset of environment-state information that the server 1 makes available to the client 2. It may contain only some of the objects, some of the terrain, and some of the rules. The client synchronized model C is always updated in exact accordance with the server synchronized model B to allow the two models to remain in correspondence with each other.

Figure 3A:
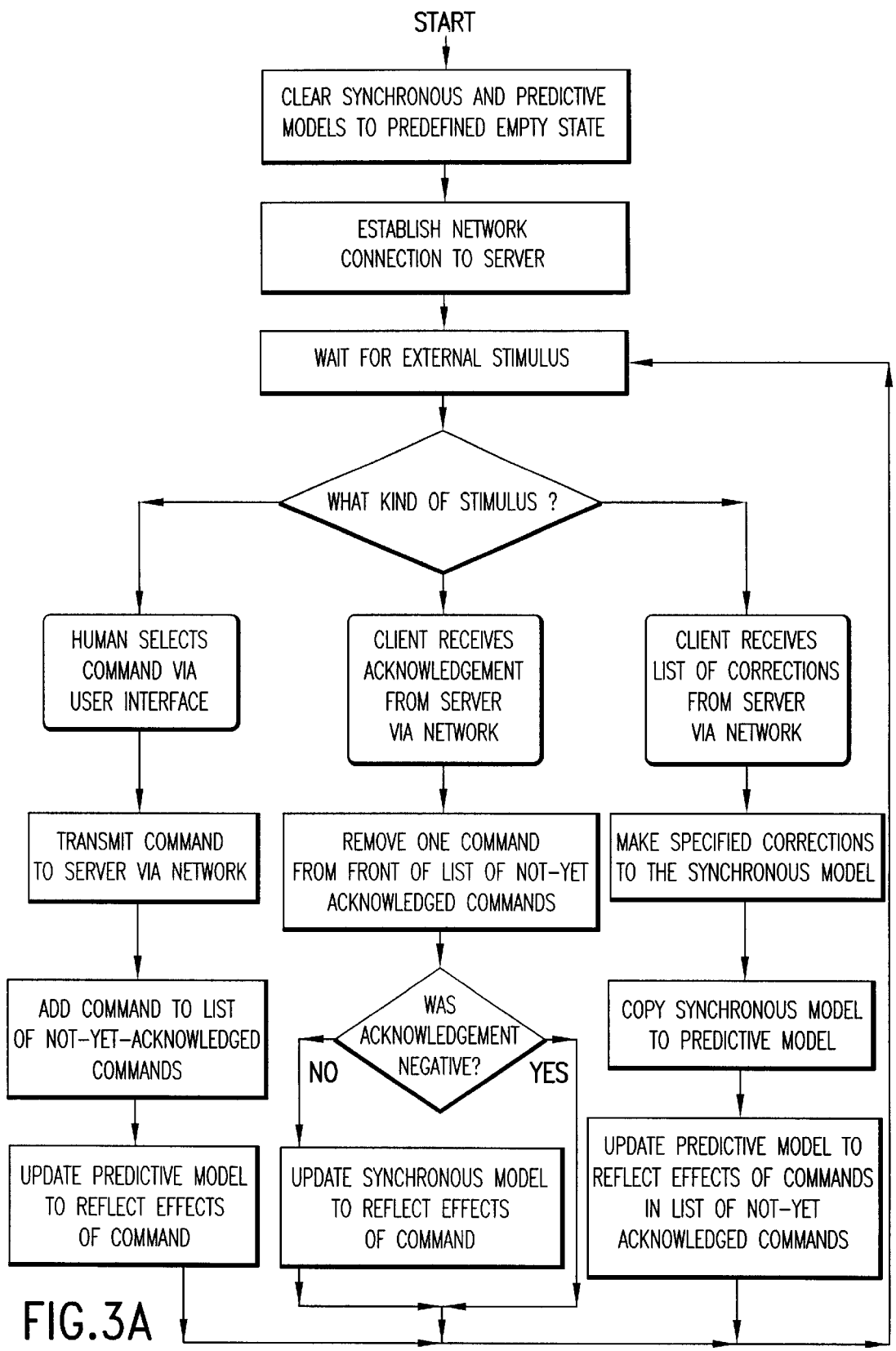
FIG. 3a shows in flowchart form the process that the client must execute to implement the preferred algorithm of the present invention.
Figure 3B:
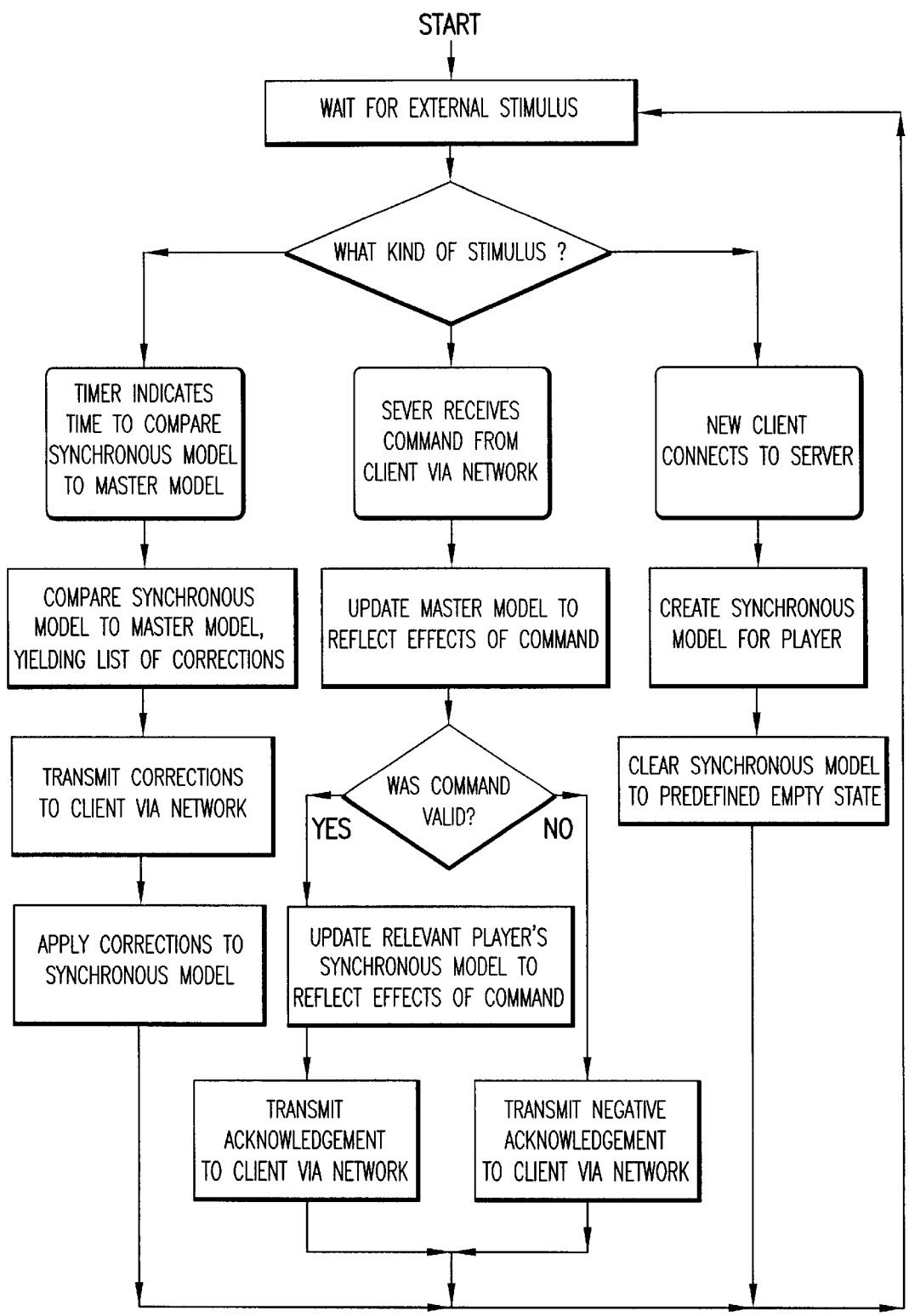
FIG. 3b shows in flowchart form the process that the server must execute to implement the preferred algorithm of the present invention.

The server 1 and client 2 synchronized models B and C, respectively, are preferably maintained using the following algorithm which is depicted in flowchart form in FIGS. 3a and 3b:

1. The server 1 occasionally compares the contents of the master model A to the server synchronized model B. The server 1 generates a list of corrections if the server synchronized model B is incorrect in some relevant aspect. The corrections are transmitted to the client 2. Both the server 1 and the client 2 apply the corrections to their respective synchronized models. An example source code implementation of this is shown in Appendix "A".

2. When the user clicks a menu item or other command, the client 2 sends the command to the server 1. The server 1 applies the command to the master model A and then to its copy of the synchronized model B. The server 1 then sends an acknowledgement to the client 2 which applies the command to the client synchronized model C. An example source code implementation of this is shown in Appendix "B".

After step one, the master A and synchronized models B and C are guaranteed to be in similar states. In step two, both models execute the same command. Because of step one they do so starting approximately the same initial state. Therefore, they tend to end up in approximately the same final state. Thus after step two they are also likely to be in similar states. Because the master A and synchronized models B and C tend not to diverge there usually are very few differences to transmit, if any, when the system performs step one again. The bandwidth requirements of this method are extremely low. The client 2 send only commands to the server 1 and the server 1 sends only minimal corrections to the client 2 allowing the implementation of complex virtual environments such as interactive multi-user games using 14.4 kbps or less.

When the client has transmitted a command to the server and is waiting for a response, the predictive model D contains the client's projection of what its synchronized model C will contain when the server 2 responds. The predictive model D is updated using the following algorithm which has already been described in Appendices "A" and "B":

1. When the client 2 transmits a command to the server 1 it applies the command to the predictive model D and adds the command to the list of not-yet-acknowledged commands.

2. After the client 2 receives an acknowledgement the command it sent to the server 1 to enable it to apply the associated command to its synchronous model C it removes the command from the not-yet-acknowledged list.

3. After the client 2 receives a correction from the server 1 and applies it to the synchronized model C it recomputes the predictive model D by copying the contents of the synchronized model C to the predictive model D and re-applying all the commands in the not-yet-acknowledged list to the predictive model D.

The effect of this algorithm is such that when no communications are on the Internet, the predictive D and client synchronized C models are identical. When a communication is taking place the predictive model D contains a valid projection of what the outcome of the communication will be.

The predictive model D is utilized as the model which is displayed on the users's screen with the effect that the user sees an instantaneous response to his command and selection which is almost always correct. In those cases where the response is incorrect the synchronized model D causes a correction which is applied in such a short duration after implementation of the predictive model D that it goes unnoticed by the user.

III. Comparing the Master Model to the Synchronous Model

In the preferred implementation, the process of comparing the master model A to the synchronous model B and C involves individually comparing each component of the models. This may include comparing the state of the sprites, the terrain grid, and the rules of the game, sending the necessary corrections for each to the synchronized model B and C in order to bring it into correspondence with the current state of the master model A.

When the client 2 first connects to the sever 1 it has no knowledge of the state of the virtual environment so it initializes its synchronized C and predictive D models to a predefined "empty state". The server 1 will initialize its synchronized model B identically. An example source code implementation in which the model is cleared to the empty state is shown in Appendix "C". Since the true state of the virtual environment as defined by the master model A is not empty, this "empty state" is not an accurate representation of the real state of the environment. Through the normal course of the algorithms described above the server 1 will notice this inaccuracy and will send corrections. In this way, the server will effectively download the state of the virtual environment to the client 2 with no need for any separate downloading procedure. Since the model may include the terrain, objects, and rules of the game, all of these items will automatically be downloaded to the client 2 with no need for any separate code to achieve this goal, instead, the first correction will contain this information. Because system characteristics such as textures, three-dimensional models, sound files and the like need not be part of the model, the algorithm of the present invention is able to minimize the amount of data that the server must transmit during this initial correction.

IV. Intentional Omissions from the List of Corrections

The server 1 may choose to ignore certain differences between the master A and synchronous models B and C if it considers them to be insignificant. For example the client 2 may believe that a particular tree is standing when in fact it has been chopped down. If in the virtual environment the user is miles away from the tree in question and therefore cannot see the tree the server 1 may deem this inaccuracy to be irrelevant and may decide not to transmit a correction from the master A to synchronous models B and C relating to the state of the tree. In this manner, the server 1 may choose to conserve bandwidth. Similarly the server may decide not to transmit information for privacy reasons. For example suppose that the virtual environment includes some objects which are valuable gems and that the object of the game is to find the most gems. The master model A contains a complete accurate description of the virtual environment including the locations of all the gems. The client 1 which is initialized to the empty state will not initially contain information about the location of the gems. The server 1 will notice this absence of this information in the synchronous model B and C which is technically a correctable inaccuracy. However if the server 1 were to send a correction to the client 2 informing it of the locations of the gems then it would be possible for a hacker to extract the locations of the gems from his client 2. This would enable the hacker to cheat at the game spoiling the experience for the other paying players. This would be a serious disaster. To avoid such disasters the server 1 can choose not to correct an inaccuracy in the synchronous model B and C if doing so would involve downloading secret information to the client. Example code which selects some information to compare and which chooses to omit other information is shown in Appendix "D".

V. Alterations to the Command Stream

Adjustments to the algorithm of the present invention make it possible for the server 1 to alter the command stream coming from the user. The server 1 recognizes commands that it accepts from the user by sending a positive acknowledgement to the client 2. When the client 2 receives a positive acknowledgement from the server 1 it applies the appropriate command to the synchronized model C. The server 1 ignores commands that it does not accept from the user by sending a negative acknowledgement to the client 2. When the client 2 receives a negative acknowledgement from the server 1 it simply discards the appropriate command instead. In this event the client 2 must recompute its predictive model D as when it receives a correction from the server 1.

The server 1 can inject a command into the stream of commands it is receiving from the client 2 if the server feels that the client "should have sent a command" which the client did not send. The server 1 will eventually acknowledge the command that it injected. Such "surprise acknowledgements" must be accompanied by a description of the injected command. When the client 2 receives a surprise acknowledgement it must apply the injected command to its synchronized model C. It must also recompute the predictive model D as it would after a correction.

VI. The Simulation Clock

The algorithm of the present invention is designed to model time as a command. At regular intervals the user interface automatically transmits "tick" commands along with all the other user commands. The server 1 will check the "tick" command stream coming from the client 2 and if it detects an irregularity it will automatically alter the command stream by either injecting "ticks" or negatively acknowledging some "ticks" in order to restore the proper command time sequence. In the preferred embodiment, this server check allows the client's model of time to deviate by up to 20 seconds from the server's, in order to allow for network delays. An example of the code necessary to accomplish this is shown in Appendix "E".

VII. Storing Rules in a Model

In the preferred implementation, the "rules" of how the various elements of a particular virtual environment are permitted to interact may be described by a "script" written in a scripting language specifically for the purpose. The scripting language may be a full-featured programming language much like Java or C++, allowing the scriptwriter to use control constructs, data structures, complicated state variables and the like which allows changing the appearance of objects, play sounds, move things around, create and destroy inventory items, modify state variables, pop up dialog boxes, alter player statistics, play animation, and in general, control every aspect of the virtual environment. The scripting language may be designed so that defects in the script are contained to the relevant part of the virtual environment. For example a defect in the rules pertaining to cars would not prevent trucks from functioning correctly.

The particular scripting language chosen for the preferred implementation includes a "plan declaration" and an "object declaration." Each plan declaration adds one or more menu items to one kind of object. A plan consists of a menu section which determines what text appears on the menu and the body which determines the actions occurring when the menu item is selected. When the player clicks on an object the menu item that appears will be a combination of all the menu items produced by all the plans. Plans are capable of being executed for an indefinite period. Plans will be able to accomplish a number of actions, for example:

moving objects around;
changing the appearance of objects;
causing objects to execute animated movements;
creating and destroying objects;
playing sounds and background music;
playing cut-scenes;
interacting via dialog windows;
reporting status information to status windows.

Each plan describes one of the rules of a game. A typical plan might appear as follows:

1. Add to the trees' menu: "Chop down the Tree"
2. When the player selects this menu item:
   A. Show the "man chopping down tree" animation;
   B. Add 100 units of wood to players inventory;
   C. Remove the tree from the game.

It will be possible to associate an "initialization plan" with an object. The initialization plan will not be invoked by a menu but instead will start as soon as a sprite of the given type is created. Plan bodies will be able to utilize a full range of programming constructs, including variables, if-statements, while- loops, and the like. State variables will be capable of holding complex information, including numbers or strings, other data types, and can be formed in arrays or tables with indices comprising integers or strings. State variables can be scoped by object so that each object will contain a set of state information In addition, global state variables can be defined. In addition to its main function of defining objects, the script will allow the creation of terrain.

The script is part of the model. In other words, an alteration to the script is no different from any other alteration to the virtual environment. Player commands may alter the script, such commands are no different from any other command. The procedures of the presently preferred embodiment of the invention will cause the update to be made in the master model A, and eventually the synchronous models B and C and predictive model D. In this way, the system may support the modification of the script while the game is in progress without stopping the game.

VIII. World Coordinates and Terrain Maps

In the preferred embodiment terrain is stored as a grid. The size of the virtual is environment is determined by a directive in the scripting language which specifies the size of the world in "world coordinates". For games that take place on a human scale, a world coordinate will usually represent about a meter. A world coordinate is the smallest unit of resolution that the system can handle. Each terrain grid cell has a number of attributes such as terrain type, elevation, pollution level, underground mineral and so forth.

To initialize the terrain grid an image file is created by the scriptwriter which is the designated as the "map of the world". If the terrain has more than one attribute the scriptwriter will create one image per attribute. For example, there might be a pollution map (in gray scale, with black being toxic and white being clean), an elevation map (in gray scale, with black being mountain top and white being valley), a terrain type map (color coded, with green for grass, yellow for sand, etc.) and an underground mineral map (with yellow for gold, white for silver, black for nothing at all, etc.) The system will support color-coded maps and gray scale maps. One designated attribute will be used for the rendering while all other attributes can be accessed via the scripting language. The meanings of these other attributes are entirely determined by the script.

In the actual execution, the master model A will include the entire terrain map. However, it may choose to only send corrections to the part of the map in which the user is active. Therefore, the synchronized models B and C and predictive model D may include only certain specific geographic regions. The terrain maps are stored in an image-storage data structure which decomposes the image into small patches and is capable of compressing and decompressing individual patches while still in their compressed form making it easier for the algorithm of the present invention to send corrections to the terrain maps. The system supports multiple distinct geographic regions called "planes" each of which has its own set of terrain maps with scripting directives to move the user from one plane to another.

IX. Threads and the Code Database

In the preferred embodiment, each object (or "sprite") in the terrain map be performing a variety of activities. Each activity is called a "thread". Each "sprite" is performing one activity (or "thread") at a time as executed by script instructions. In a multi-user interactive game if there are 1,000,000 sprites in the world and 20 servers then each server will be in charge of 50,000 sprites requiring the system to process about 50,000 threads per second. Each thread usually accomplishes a simple task such as adding items to an inventory or displaying an animation or the like. The average thread must be capable of executing ten or so script instructions per second.

To make this possible the system translates script into p-code where the threads are C++ objects representing p-code in various stages of execution. Each sprite may have a number of threads running through it. A thread will contain the following parts:

an array of p-codes;

a program counter referring to the array of p-codes;

an array of "registers";

suspension information.

The p-code array will simply be an array of short integers with each instruction being made up of one or more short integers. The p-code operates on a "registers" array which is used to hold all the local variables for the thread and any other data the thread is required to access frequently. Each p-code instruction specifies a set of input and output registers.

The thread suspension information indicates whether or not the thread is blocked (waiting for data). If the thread is blocked, it may be waiting for user input or for time elapse or the like. When the thread is blocked the system sets aside the C++ object representing the thread and performs another threaded task. The thread data structure is part of the sprite data structure meaning that means that every action that occurs in the world is considered the act of a particular sprite. In rare cases, it may be desirable to have something happening without a visible actor which requires use of an invisible sprite.

The model includes a code database that contains the plans from the script. A compiled plan contains two parts: the menu section and the action section. Both sections are blocks of executable p-code. Each block of executable p-code contains these parts:

an array of p-codes;

an initial program counter;

a set of initial values for registers;

parameter information;

a copy of the original source code (for debugging).

This information is used to initialize a thread. A plan has parameters which are fed to the thread by injecting them into a register array where the parameter information specifies the register used. The code databases in the partial master models are initialized by running the script compiler. The first pass of the script compiler reads the script and parses it yielding what is known as a "parse tree". The second pass scans the parse tree to output compiled plans into the code database. It is possible for the compiler to compile additional script files and output the plans into the same code database even if the game has been running for a while. Certain compiler directives also make it possible to remove plans from the code database making it possible to alter the game rules while the game is running. Since the code database and threads are part of the model, the procedures of the present invention will automatically cause the synchronous B and C and predictive models D to approximate the state of the code database and threads in the master model. This requires no extra code except that necessary to compare the code database and the threads.

X. State Variables

The scripting language can store data in "state variables" and these state variables are part of the model. There are two sets of variables: global state variables and sprite-local state variables. State variables can have indices, which may be integers, strings or other atomic data types. To implement this, the model will store script variables in "hash-tables". The hash tables map an array of keys to a value where both the keys and the value are dynamic. While hash tables are primarily intended for storing variables they are also used to store other miscellaneous information about sprites in order to keep the data structures from becoming very complex.

XI. Sprites

The model contains a list of users that each has a list of associated sprites. Each sprite contains information about the plane it is located on, its position on the plane and a list of threads that are running inside the sprites and a table for storing variables. To update the display, it is necessary to get a list of all the objects in a particular region. The sprite map makes this possible by decomposing the world into patches of size 256×256 world coordinates with each patch containing a list of the sprites inside that patch.

XI. Parallelization of the Player Records and Sprites

In the preferred implementation the server 1 may consist of a parallel supercomputer or a network of workstations. In such a configuration, each user is assigned to one server or node of the supercomputer. The user connects by TCP/IP to his assigned server and does not interface directly with any other server. The mapping of players to servers is semi-permanent but can be altered. When there are multiple servers, no one of those servers contains the entire master model A. Instead each server computer contains a "partial master". At any given time, the authoritative information about any given user is stored in just one of the partial master models. Each user is assigned to a particular server known as the "home server". The client connects to the user's home server. Most of the time the authoritative information about a user is stored in the partial master model residing on the user's home server though this information may temporarily move to the partial master model of another server.

When a user issues a command it goes to the user's server. Each ID command may directly affect one user. A server will process a command that affects a user if the server has authoritative data about that user. If the server does not have the authoritative data it sends off a request to the user's home server. The user's home server responds to the request by forwarding the authoritative data. The server processing the command sets the command aside until the authoritative data arrives then completes the processing of the command.

As explained above, each thread is considered to be part of a sprite. Threads may access users at will one at a time. If a thread attempts to access a user whose authoritative data is not present, the thread is paused and a request is sent to the user's home server. The user's home server responds to the request by forwarding the authoritative data. The server processing the thread pauses the thread until the authoritative data arrives then resumes the execution of the thread. The user's home server is responsible for transmitting corrections to that user. It can easily transmit corrections about the user's own state as that information is usually present and authoritative. However, the server may not be able to transmit information about the state of other users as the server may not have authoritative information about those users.

To make it possible for a user to receive information about other users the following technique is preferably followed. Whenever a server 1 updates its partial master model it may choose to broadcast the update to the other servers. Servers 1 only broadcast information which is critical for the client 2 to maintain the appearance of the environment. The server 1 may refrain from transmitting some information to the client for privacy reasons or to minimize bandwidth. Critical information about an object includes information about its visual properties, information about its menu contents, and any state variables needed to give a rapid response when the user selects a menu item. When a server 1 broadcasts an update to a state variable, the servers that receive the broadcast store the information and mark it non-authoritative. Servers never compute with non-authoritative data. However, when the server compares the master model A to its synchronized model B it includes the non-authoritative data which is a thereby included in the synchronized model allowing the clients 2 to receive corrections that pertain to other users even when those users are connected to other servers.

DETAILED DESCRIPTION OF OPERATION

By way of example, use of the invention is described in the context of a very simple three-player card game. It should be understood that the invention is not limited to this particular game, nor is it limited to card games, nor is it limited to three-player games. We utilize this simple example for the sake of clarity of exposition.

Figure 4:
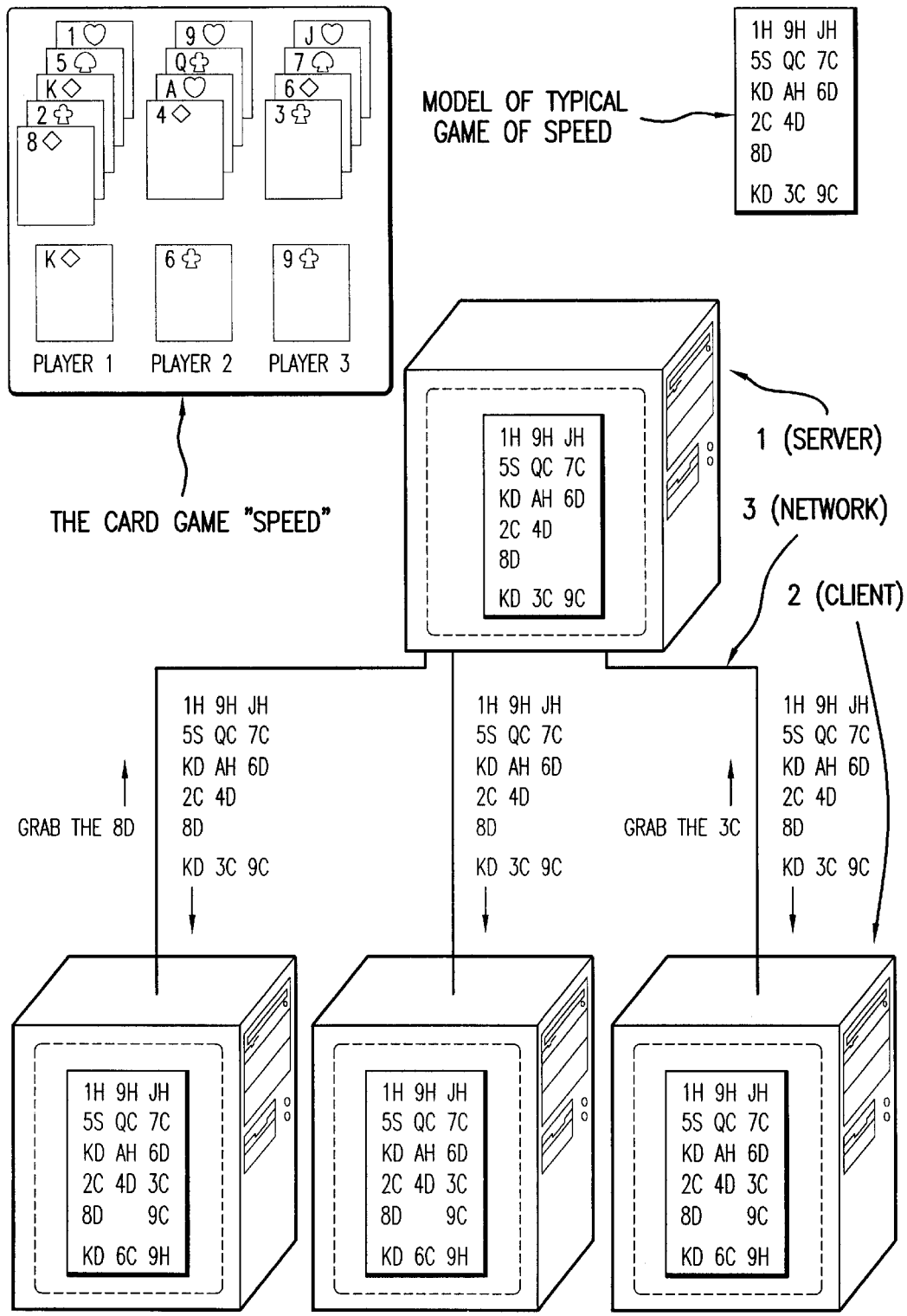
FIG. 4 shows a the prior-art implementation of a simple card game.

FIG. 4 shows the card game "speed." The game is dealt as follows. First, the cards are shuffled, and each player is dealt one card. The remaining cards are split into three piles of roughly equal size. The piles are placed face-up, and each pile is fanned out, so that the cards are all visible. Once the cards are dealt, the game begins. Each player visually scans the tops of the piles for a card that "matches" his card. Two cards "match" if they are in the same suit, or if they have the same face value. When the player sees a card that matches the card in his hand, he grabs it. After grabbing a card, the player discards the card in his hand, and replaces it with the card he grabbed. Therefore, the player only ever has one card in his hand. Note that the players don't "take turns"—this is a game of speed, each player grabs matching cards as fast as he can. The game ends when there are no cards left to grab, or when all the players are "stuck." The winner is the player who grabbed the most cards.

The primary objective of the invention is to minimize the perception of lag in networked computer games. In particular, the invention applies to client-server games. These games typically utilize hardware as that shown in FIG. 1 which shows three computers (bottom) each with a player sitting in front of it, and a server computer (top) which has been set up to arbitrate the game. Each player's computer is connected to the server computer by means of a communication network—usually, the Internet. It is assumed that the communication network has appreciable latency. For example, if the players are connected to the Internet through modems, the one-way latency is typically at least 125 milliseconds within the continental United States, and frequently ranges into several seconds.

This network of computers could be programmed to play the card game "speed" using prior-art technology. If this were done, the data inside the computers and moving through the communication links during the middle of a game might appear as shown in FIG. 4. In this game the virtual environment in which the users are participating consists simply of a card table with some stacks of cards on it, and three hands with one card in each. The central server's memory 1 contains an authoritative master model A of the virtual environment: namely, a list of which cards are in which piles, and which card each player is holding. The server 1 periodically transmits the contents of the master model A to each of the player client computers 2 via the internet communication links. When the clients 2 receive this information, they store it. The stored information is called the "slave model" C. There is one slave model C in each player computer. Each player's computer displays its slave model C on the screen. A human player can command the computer to "grab" a card by clicking on it. The player's computer 2 forwards this command to the central server 1 via the communication link. When the server 1 receives the command, it may choose to honor it or ignore it. It ignores a command to grab a card if the card has already been grabbed by some other player. If, on the other hand, the server 1 chooses to honor the command, it updates the master model A in the appropriate manner, namely, removing the card from the pile and altering the given player's hand. Since the master model A is periodically transmitted to the players' computers, the players will eventually see the effects of the command.

Assume that the communication network is the Internet, and assume that the Internet is not at all congested that day—in other words, that it is taking about 125 milliseconds for messages to arrive at their destination. From the time that the user clicks to the time that the grab command arrives at the server 1, 125 milliseconds have elapsed. It may takes the server 50 milliseconds to process the command. Then, the server 1 has to send an updated description of the game back to the client 2, adding another 125 milliseconds to the delay. The total will be 300 milliseconds. From the time the user clicks to the time that the card disappears off his screen, approximately a third of a second will have elapsed. This is a very perceptible delay, and it makes the computer feel unresponsive.

However, if the Internet is congested, the situation becomes much worse. Frequently, messages get delayed by as much as a few seconds. The human clicks on a card, and nothing appears to happen. The user wonders if the computer "was paying attention", and he clicks again. Still, nothing happens. The player begins to get aggravated, because after all, this is a game of speed, and he feels he's losing because the computer isn't responding. He clicks again. Finally, the Internet catches up, and all three of the user's clicks get to the server—and suddenly, the player sees that he's grabbed three cards off of the stack, not the one card he intended to grab. Now he has a card he didn't want. He is likely to give up in frustration.

Figure 5:
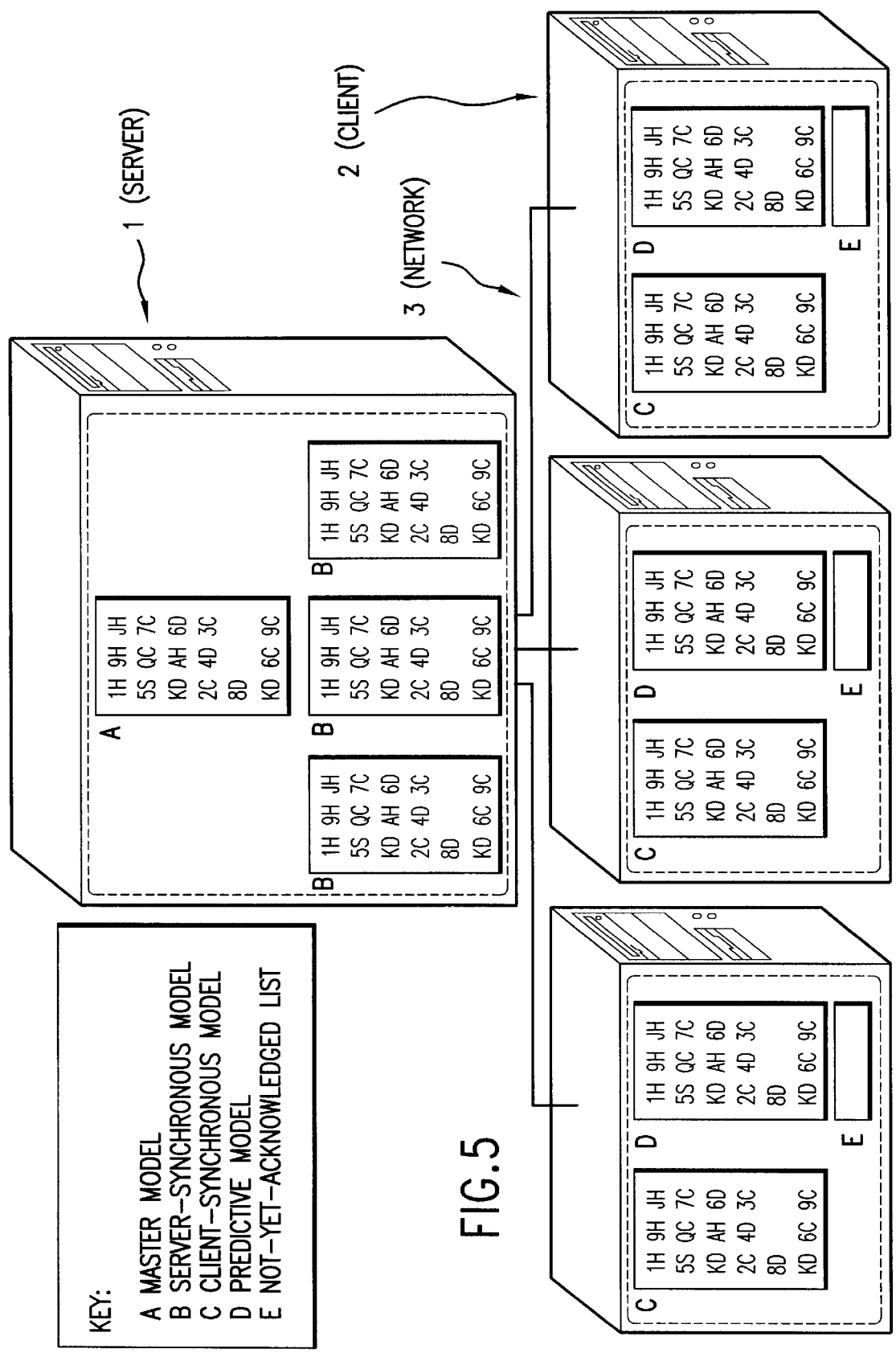
FIG. 5 is a depiction of the preferred embodiment showing its use in the implementation of the simple card game.

The invention is designed to minimize the human's perception of lag as caused by network latency. To achieve this end, the invention requires that the client and servers store several items of data. These items of data are shown in FIG. 5. In this figure the virtual environment consists of a table with cards on it depicting a model as a tiny picture of a card-table with cards. It is understood, however, that the invention would work for other games equally well in which case the model would contain other information. The particular items of data that must be stored consists of the following:

a. In the server 1, a master model A. Conceptually, this represents the authoritative description of the state of the game.
 b. In the server 1, one synchronized model B per client 2. The synchronized model B contains a subset of the information in the master model A—in particular, the subset that the server 1 makes available to the client 2.
 c. In the client 2, a list of recent commands. These are the commands that the human has issued, but which have not yet been acknowledged by the server 1.
 d. In each client 2, one synchronized model C. The synchronized model in the client 2 is exactly identical to the corresponding synchronized model in the server B, though updates to it happen slightly later than updates to the synchronized model in the server B because of network latency.
 e. In each client 2, one predictive model D. The predictive model D represents the client's prediction of the state of the synchronized model when the server 1 acknowledges the recent commands from that client 2.

In addition to these items of data, there are five procedures that the client and server must execute to correctly implement the invention as shown in FIGS. 6 through 10:

Procedure 1: When the human issues a command the client 2 forwards that command to the server 1 by means of the communication network and also adds that command to the end of the recent commands list. Finally, it computes the effects of the command using the predictive model D, and updates the predictive model D to reflect those effects.
 Procedure 2: When the server 1 receives a command it computes the effects of the command using its master model A which is updated to reflect those effects. Then, separately it computes the effects of the command using the appropriate synchronized model B which is updated to reflect those effects. It should be noted that the results computed with the synchronized model B may be different from those computed with the master model A. Finally, the server 1 sends an acknowledgement (merely the word "ok", or the like) to the client 2 by means of the communication link.
 Procedure 3: When the client 2 receives an acknowledgement from the server 1 it removes one command from the front of the recent commands list. This is the command that was acknowledged. The client 2 computes the effects of this command using its synchronized model C which is updated to reflect those effects.
 Procedure 4. Occasionally, the server 1 selects a synchronized model B and compares it to the master model A. If it finds significant differences, it compiles a list of those differences. It transmits the list of differences to the client 2 corresponding to that synchronized model B. Then, it modifies the synchronized model B so as to eliminate the differences.
 Procedure 5. When the client 2 receives a list of differences from the server 1 it modifies its synchronized model C so as to eliminate the differences. Then it recomputes its predictive model D. To do so, it copies the synchronized model C into the predictive model D. Then, for each command in the recent command list, it recomputes the effects of that command using the predictive model D which is updated to reflect the effects of that command.

Figure 6:
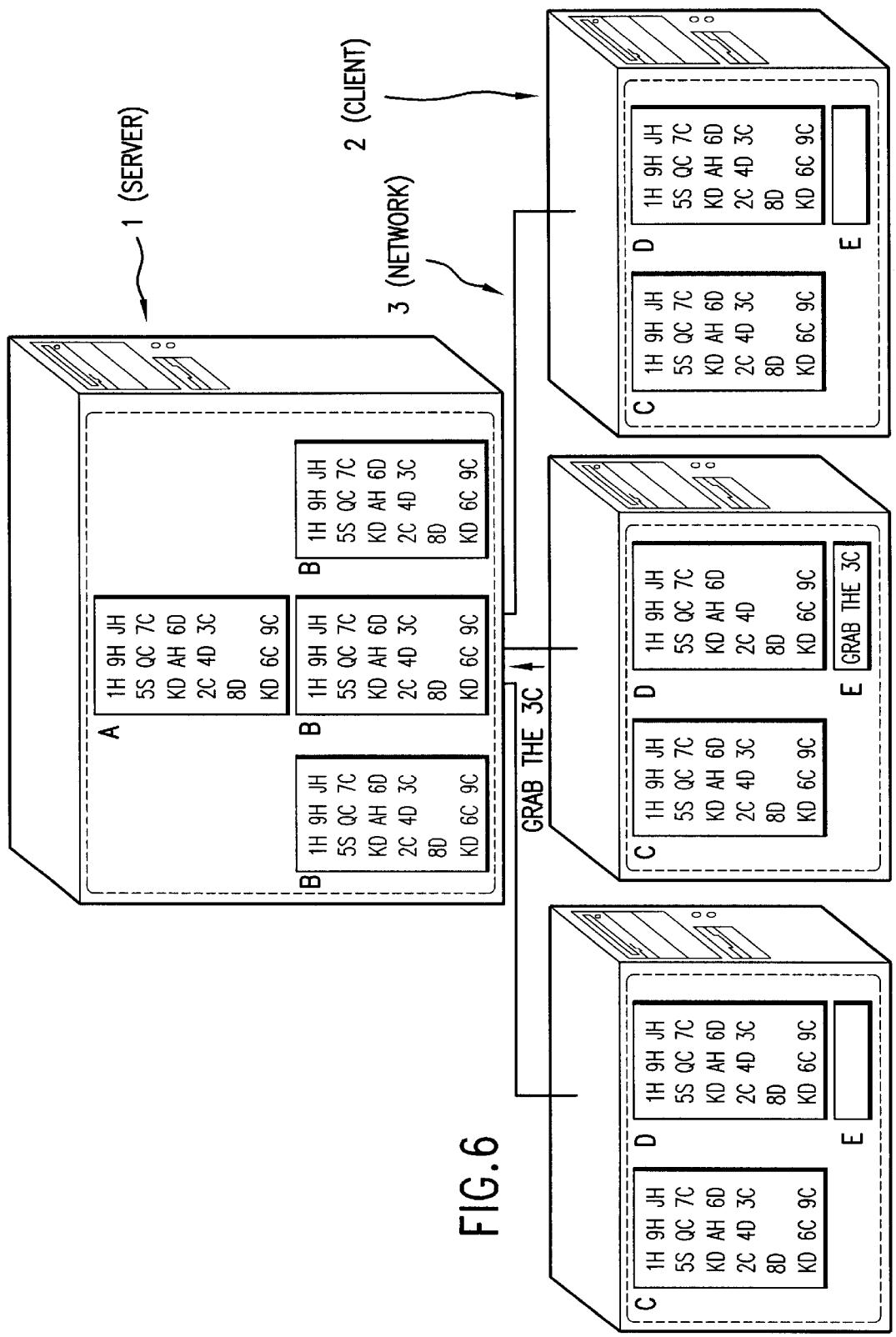
FIGS. 6 through 10 show a step-by-step example of use of the invention.

These procedures are now shown in operation in the context of an example game of "speed." The game starts in the configuration shown in FIG. 5. Player 2 makes the first move: he grabs the three of clubs. Player 2's computer 2 performs procedure 1: it forwards the command to the server 1, adds the command to the recent command list and computes the outcome of the command using its predictive model D2. The outcome of this procedure is shown in FIG. 6. Observe that the predictive model D2 in player 2's computer 2 has been changed so that there is now something in player 2's recent command list and there is a message on its way to the server from player 2's computer.

Figure 7:
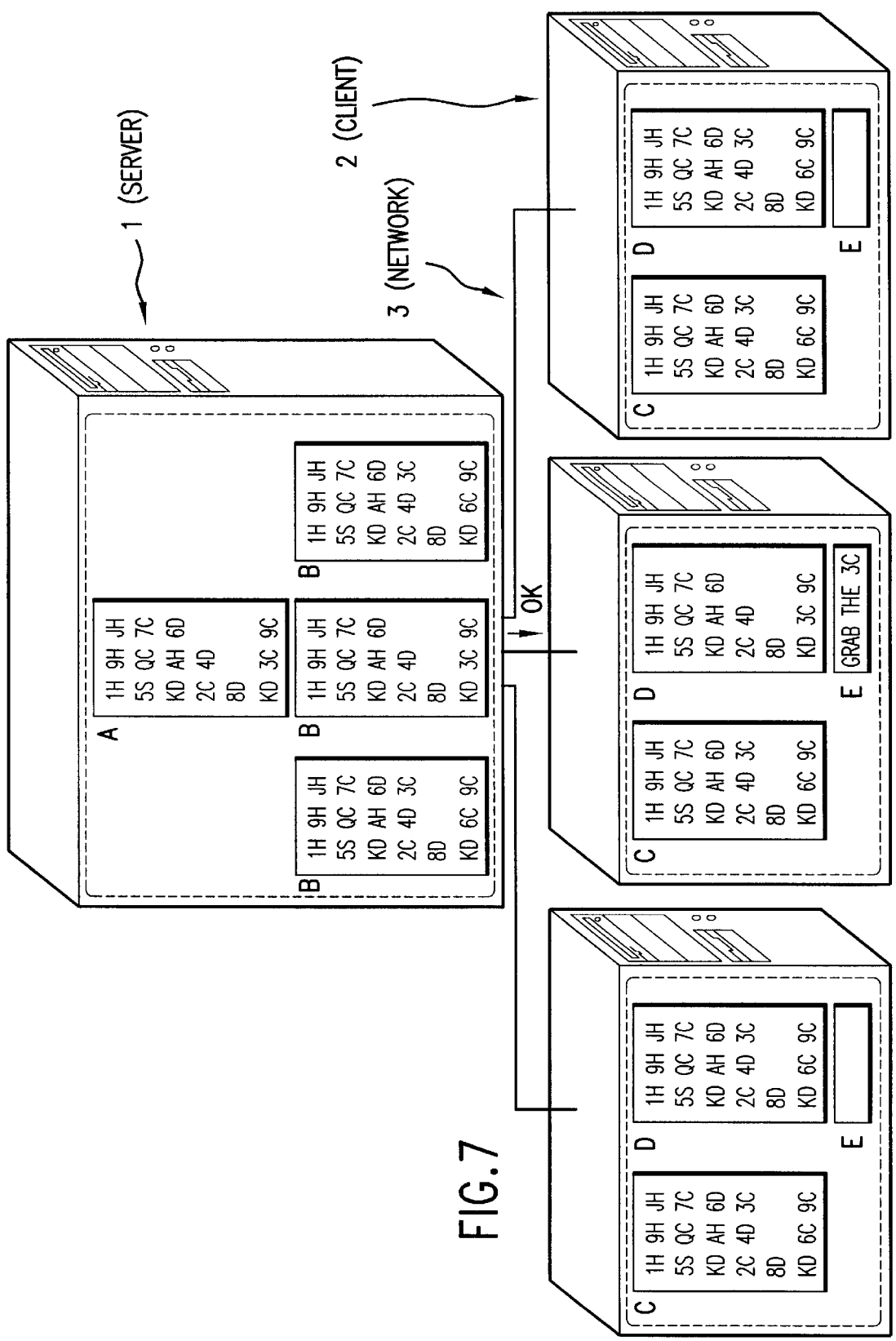

A moment later, the server 1 receives the command. It executes procedure 2: it computes the effects of the command using both the master model A and synchronized model B2 and sends an acknowledgement back to the player 2 client 2. The outcome is shown in FIG. 7. Observe that the master model A in the server and synchronized model B2 have both changed, and that there is an acknowledgement on its way back to player 2's computer 2.

Figure 8:
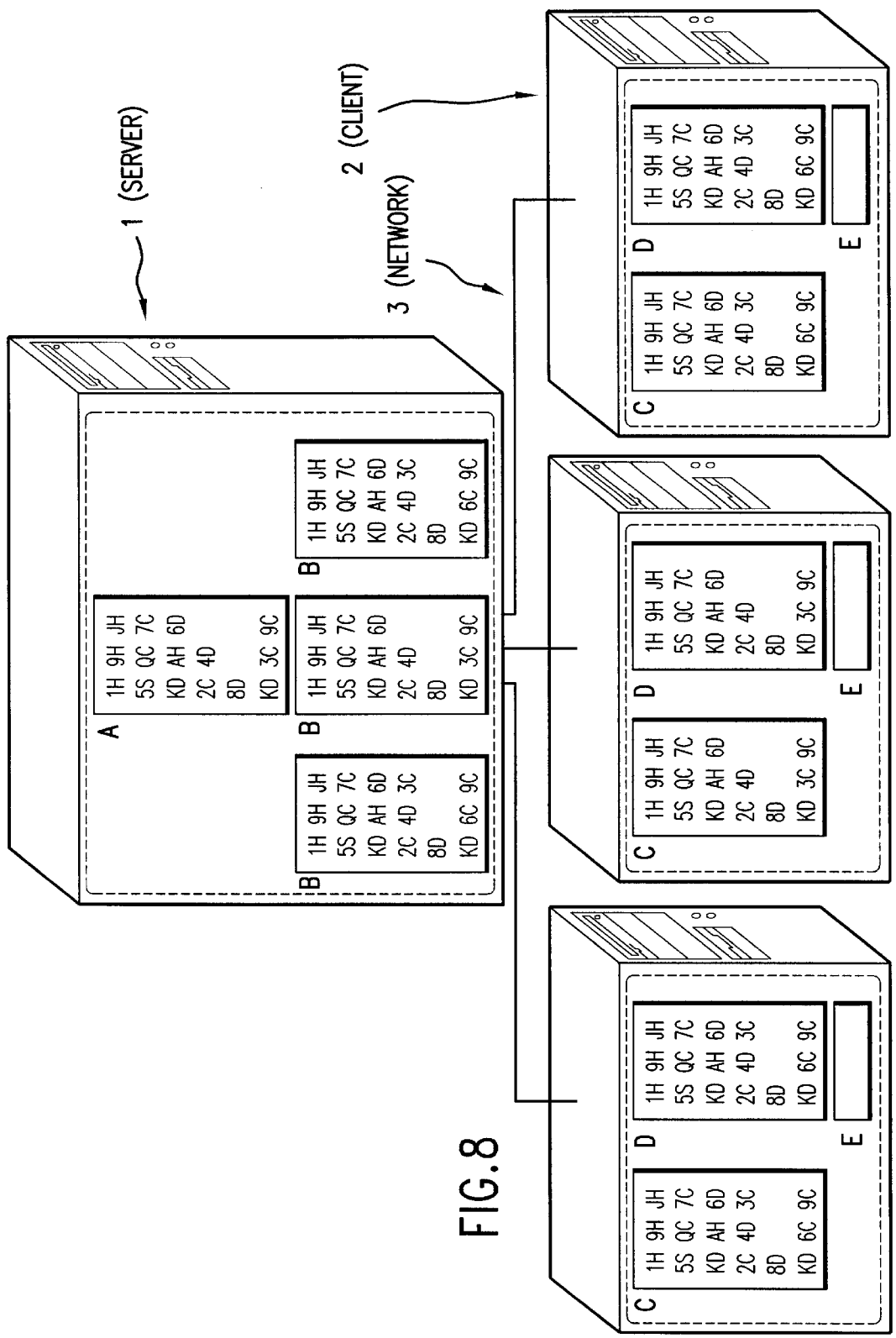

Soon, the client 2 receives the acknowledgement. It executes procedure 3: it removes the command from its recent command list, and computes the effect of that command using its synchronized model C2. The outcome is shown in FIG. 8. Observe that player 2's recent command list is empty again, and that its synchronized model C2 has changed.

Figure 9:
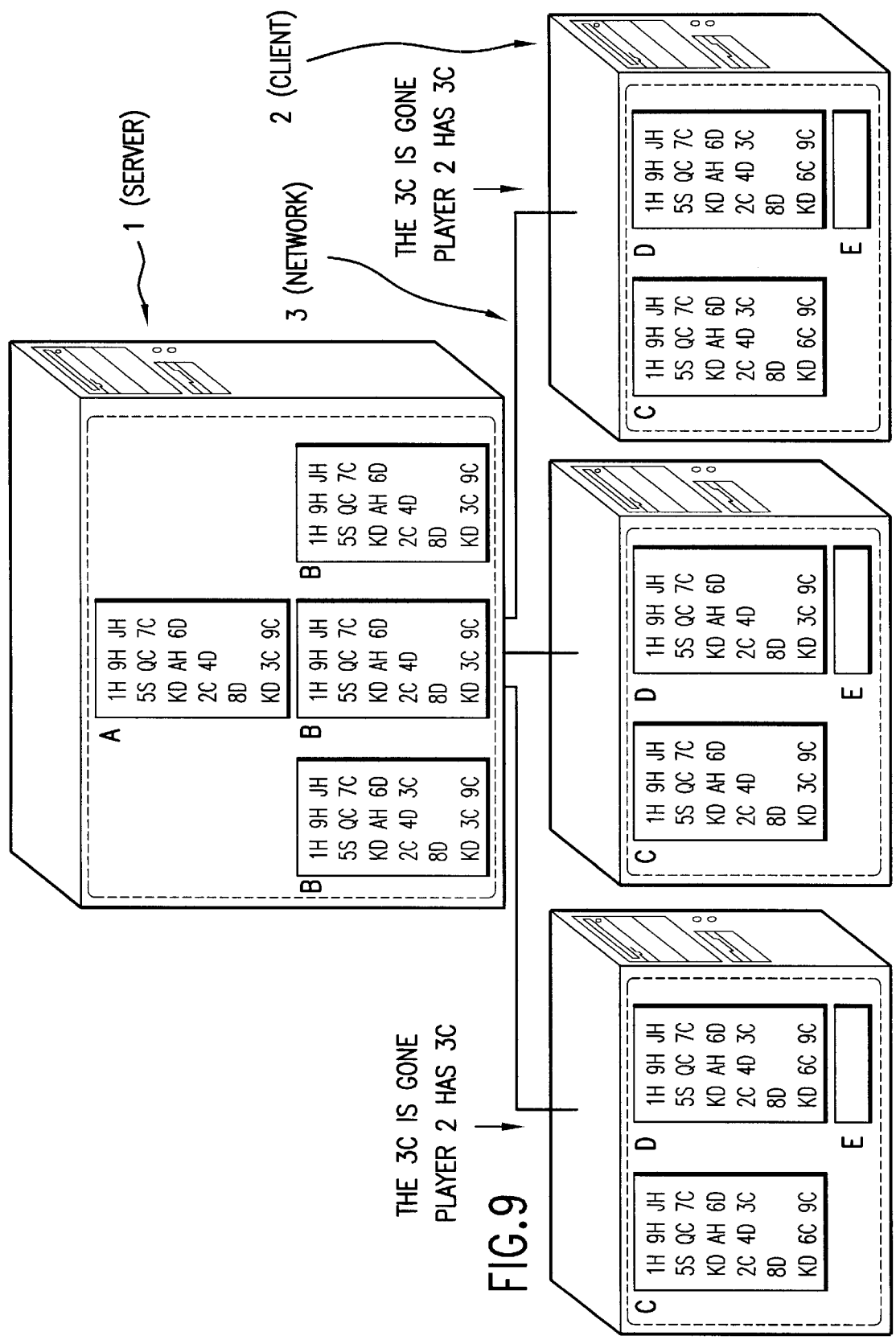

The server then decides it is time to execute procedure 4. It compares synchronized model B1 to the master model A, and discovers a difference, namely, that the three of clubs is present in the synchronized model B1, but absent in the master model 1. It sends this difference to the player 1 client 1, and modifies synchronized model B1 so as to eliminate the difference. It repeats this process for player 3. The outcome is shown in FIG. 9. Observe that there are messages on their way to the computers of player 1 and player 3, and that the server's synchronized models 1 and 3 have changed.

Figure 10:
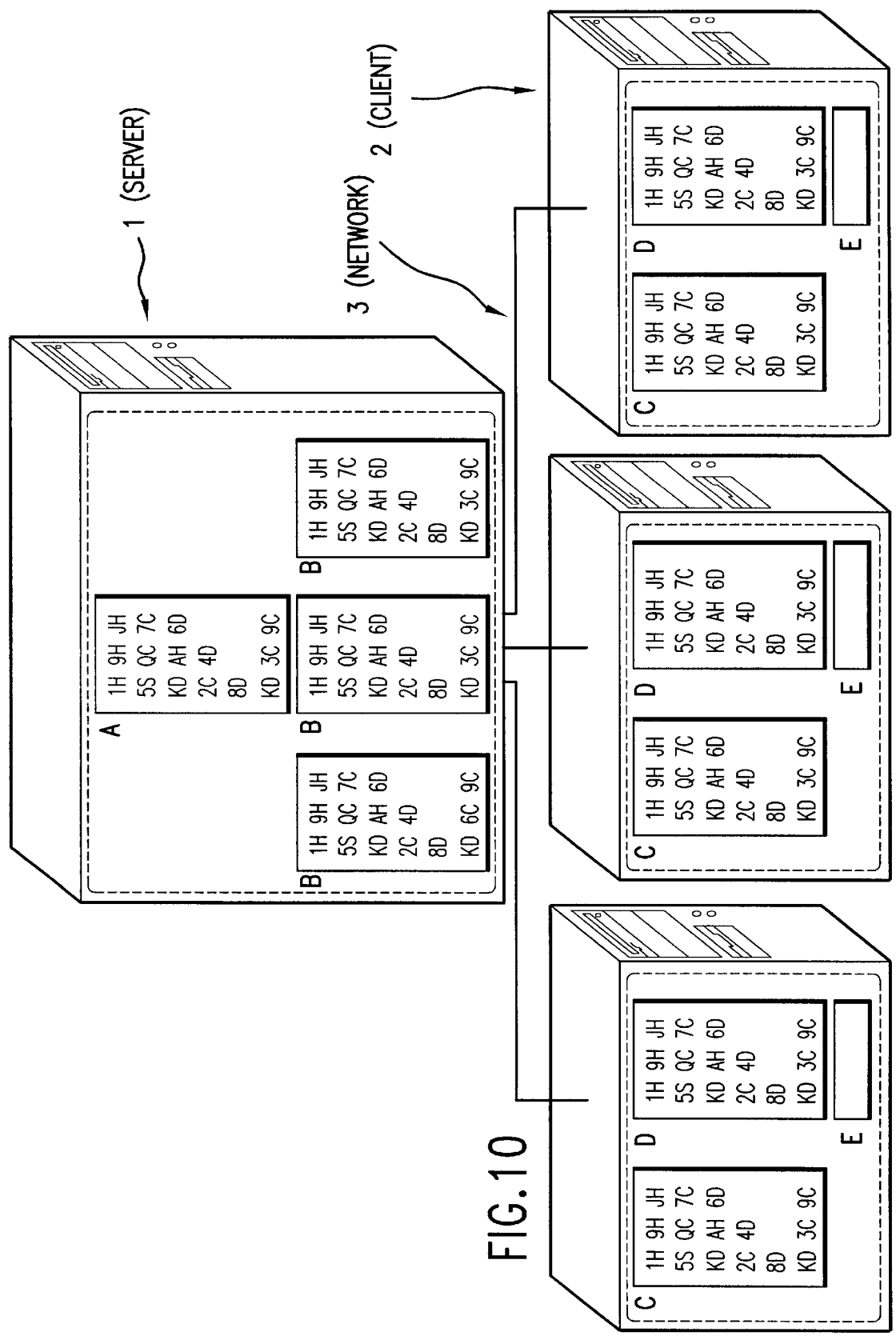

Player 1's computer then receives the list of differences from the server, and it executes procedure 5. It updates its synchronized model C1 to remove the differences. Then, it copies its synchronized model C1 to the predictive model D1. Since there is nothing in its recent command list, it is done. Player 3's computer does the same thing. The outcome is shown in FIG. 10. Note that all the models are completely back in synchronization.

Figure 11:
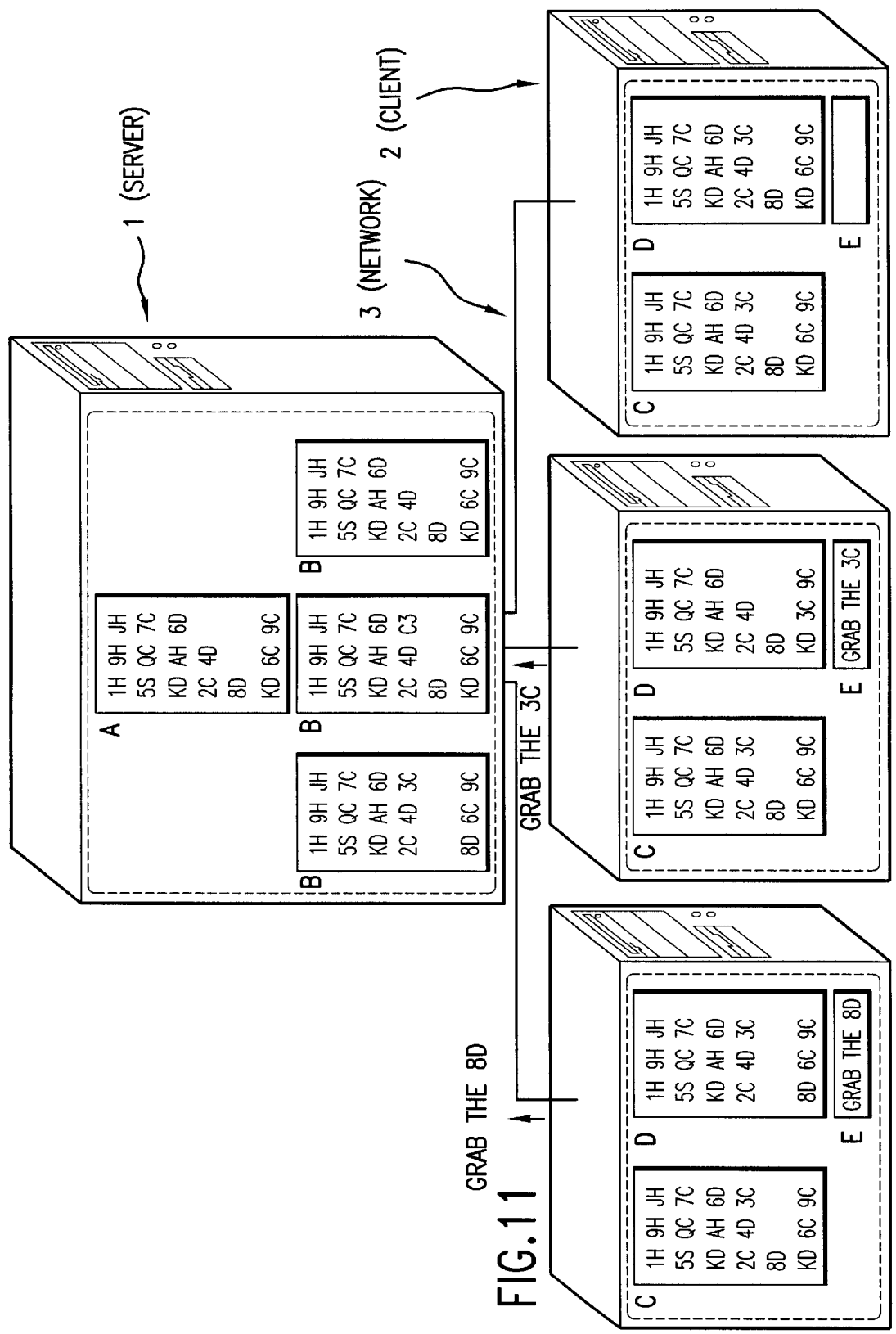
FIGS. 11 through 15 show a second step-by-step example of use of the invention.
Figure 12:
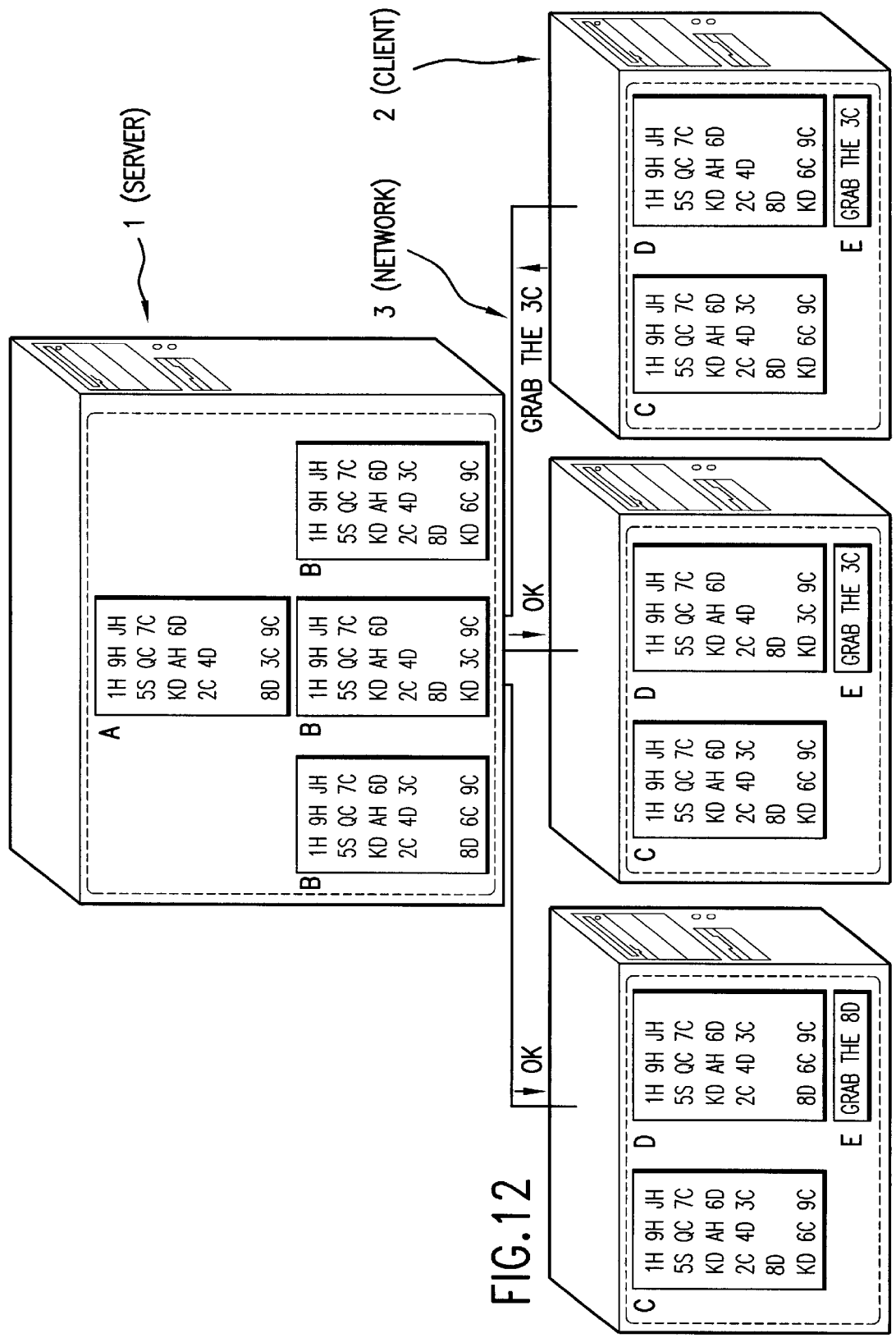
Figure 13:
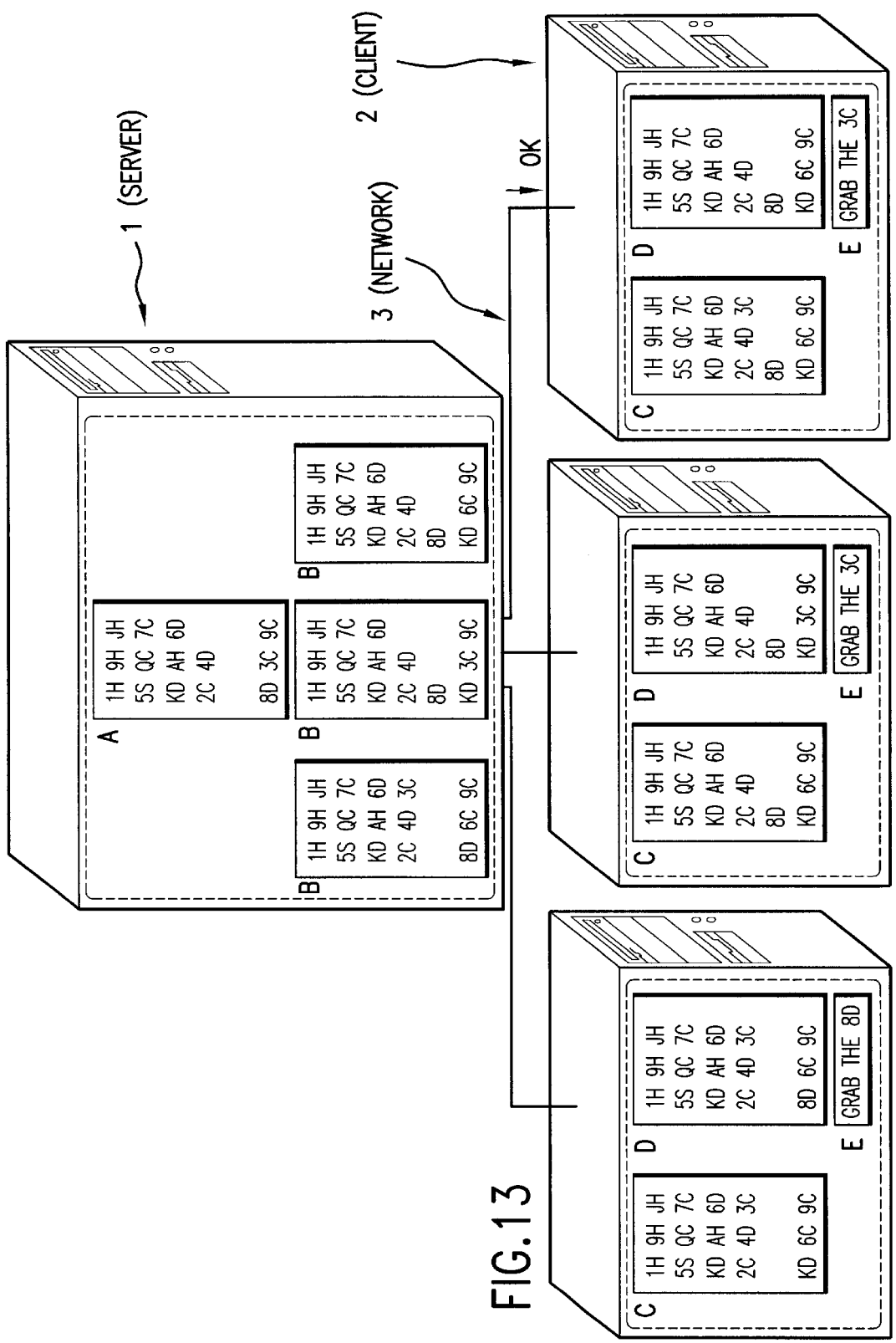
Figure 14:
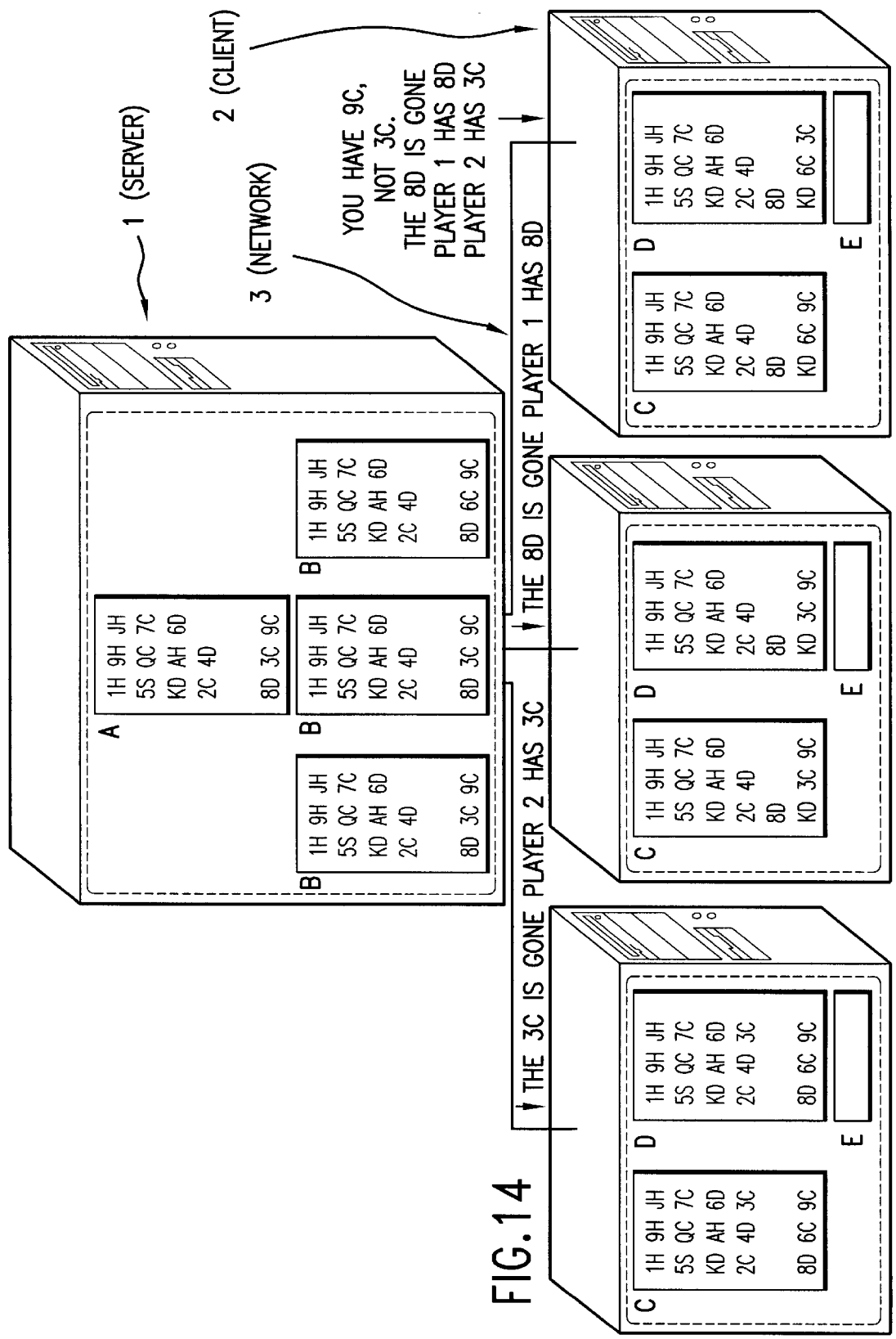
Figure 15:
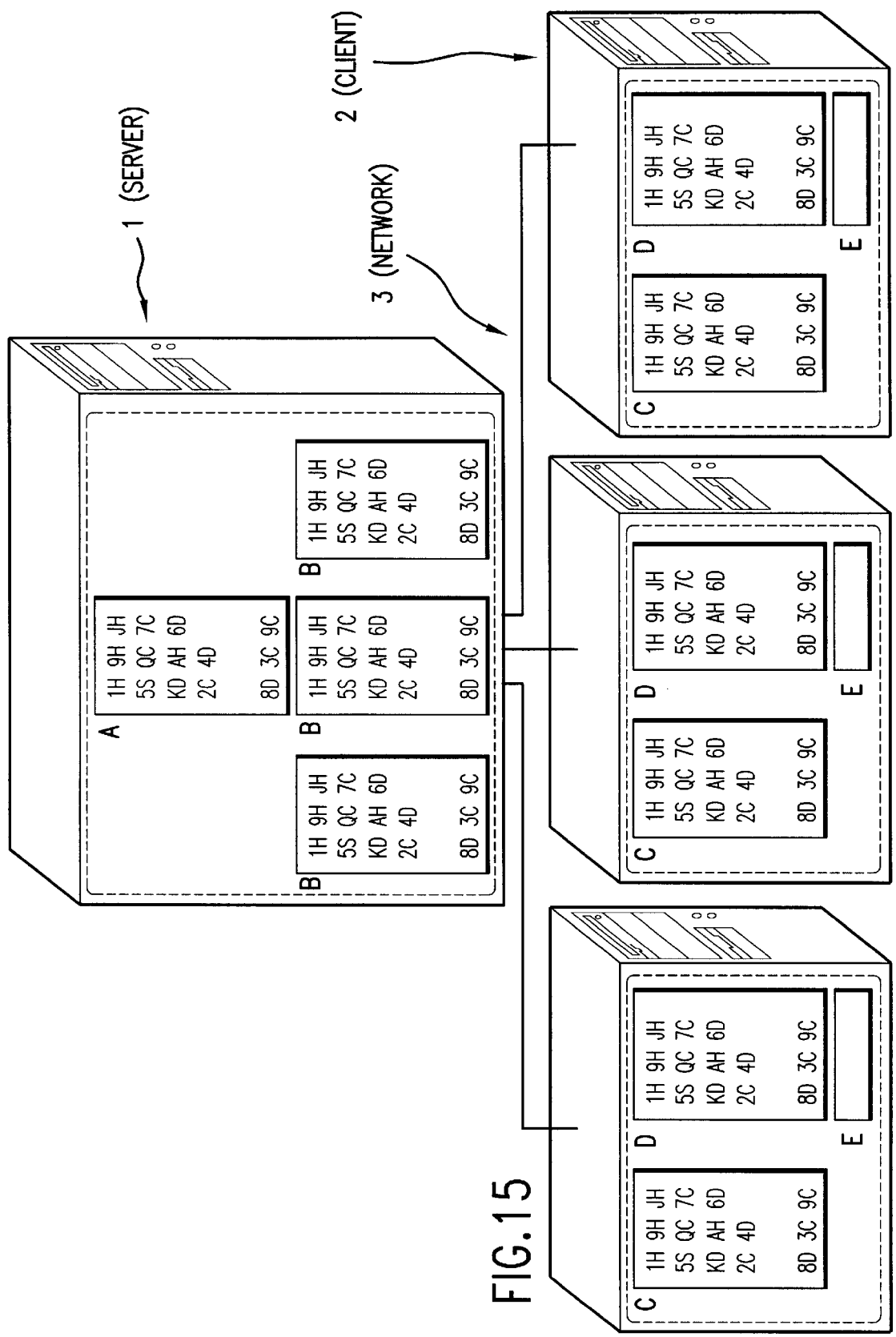

In FIGS. 11 though 15 we now show another example, this time, using a more complex sequence of events. The game starts when player 2 grabs the three of clubs, and at approximately the same time, player 1 grabs the eight of diamonds. Player 1's computer and player 2's computer both execute procedure 1. The outcome is shown in FIG. 11. A moment later, the server 1 receives the two commands, and executes procedure 2 twice. At the same moment, player 3 (whose computer is not yet aware that the three of clubs has been taken) attempts to grab the three of clubs. The outcome is shown in FIG. 12. Player 1's computer receives the acknowledgement, as does player 2's. Both execute procedure 3 successfully. Meanwhile, the server 1 receives the command from player 3, and executes procedure 2. Note that when it computes the results of the command using the master model A, it realizes the command is no good, and ignores it. The outcome is shown in FIG. 13. Player 3's computer receives the negative acknowledgement and processes it using procedure 3. Meanwhile, the server 1 decides it is time to execute procedure 4 for each player. It compares each of the synchronized models B to the master models A and sends out lists of differences. The outcome is shown in FIG. 14. Finally, all three player computers 2 receive the difference lists from the server 1. All three execute procedure 5. The outcome is shown in FIG. 15. Note that all the models are completely back in synchronization.

Although our previous example shows the present invention being used for a simple game, the present invention can be utilized regardless of the complexity of the virtual environment. Suppose, for example, that the virtual environment consists of a large world, in which the players can collect money, travel from place to place, purchase objects, build items, and in general, conduct a broad array of activities. Suppose, then, that in this virtual environment there is a pile of 10 coins on the ground, and that player 1 and player 2 are both standing near the pile. Suppose, then, that both players simultaneously issue the command to grab the pile of coins. Both clients simultaneously send the command to the server. And, both update their predictive models to reflect the effects of the command: player 1's predictive model shows that player 1 has the coins, and player 2's predictive model shows that player 2 has the coins. When the players look at their screens, both see that they have the coins. Then, the server receives player 1's command, and updates the master model to reflect the effects of the command: the master model now shows that player 1 has the coins. The server then updates player 1's synchronous model to reflect the effects of the command: player 1's synchronous model now also shows that player 1 has the coins. The server sends an acknowledgement of the command to player 1. Eventually, the server compares player 1's synchronous model to the master model, and finds that it contains no inaccuracies: player 1's synchronous model shows player 1 having the coins, which is also the case in the master model. No correction is transmitted.

Then, the server receives player 2's command, and updates the master model, but player 2's command has no effect on the master model, because the coins are gone, already taken by player 1. So the master model still shows that player 1 has the coins, and that player 2 does not. Then, server the server updates player 2's synchronous model to show the effects of the command. So player 2's synchronous model shows that player 2 has the coins. The server sends an acknowledgement of the command to player 2. Eventually, the server compares player 2's synchronous model to the master model and finds a serious inaccuracy: player 2's synchronous model shows player 2 having the coins, whereas the master model shows player 1 having the coins. The server transmits a correction to player 2, informing player 2 that he doesn't have the coins, player 1 does. Suppose, however, that the Internet is running slowly and that the correction is delayed by the network. In that case, player 1's models still show player 1 having the coins, and player 2's models still show player 2 having the coins. Suppose that player 1 issues the following commands: walk to the store, buy an axe, walk to a tree, chop it down. Meanwhile, suppose that player two issues the following commands: walk to the store, buy some hardware, and build a box. Both clients' predictive models will be updated to reflect all of these activities. Player 1's screen will show player 1 standing next to a felled tree, and Player 2's screen will show player 2 standing next to a newly-assembled box. Finally, the acknowledgement and correction which were delayed by the Internet arrive at player 2's computer. The acknowledgement causes player 2's client to update its synchronous model, and the correction causes it to repair its synchronous model, removing the coins from player 2's inventory and adding them to player 1's inventory. It then recomputes its predictive model. It copies the synchronous model to the predictive model, and applies the following commands, which are still in its not-yet-acknowledged list: walk to the store, buy some hardware, build a box. The predictive model will show that the "buy some hardware" command fails, because the predictive model now indicates that player 2 has no coins with which to buy the hardware. Then, it will compute that "build a box" fails, because player 2 has no hardware with which to build the box. Player 2 will see the box disappear. Player 2's experience was unfortunate, he thought he got the coins, and thought he used them to build a box, only to be shown that he didn't get the coins a moment later.

Usually corrections arrive at their destination within a few seconds, so the screen only shows an error such as this one for a few seconds. More importantly, such errors happen very rarely: in this example, they only happen when two players grab the same pile of coins at exactly the same moment. The value of the design can be understood when we consider the experience of player 1. He was able to pick up the coins, walk to the store, buy an axe, and chop down a tree, all without a response from the server. In other words, he was able to keep playing in a completely lag-free manner, despite the fact that the Internet was not responding. This will be the experience of most of the users.

While presently preferred embodiments of the invention have been shown and described in particularity, the invention may be otherwise embodied within the scope of the appended claims.

What is claimed is:

1. A computer system used for transmission of information between multiple users interacting on a distributed computer network comprising at least one server computer connected to a plurality of client computers, said clients and servers computers providing related models of a state of virtual environment in which users interact utilizing said models to compensate for any inherent latency in transmissions, said latency being compensated by each client providing a predictive model of said virtual environment which is updated to reflect the effects of the commands issued by a user of said client before said client is provided access by said server to commands issued by any other user, one of said servers providing a master model reflective of the true state of the virtual environment which is updated to reflect the effects of the commands issued by said clients, and wherein the client and server each provide synchronous models which remain consistent with each other to provide a best nonpredictive information available to the client so that said server identifies errors within the synchronous model and transmits corrections to said errors to the client, such that the server and client may apply said corrections to said synchronous models and said predictive model to resolve any inconsistencies that may exist between said predictive model and said master model, said models being maintained by execution of a method that compensates for latency comprising:
  a. said server performing a comparison of the contents of said master model to a client synchronized model and generating a list of corrections if said synchronized model does not match said master model in some relevant aspect;
  b. said server transmitting said corrections to said client to allow application of said corrections to said synchronized model at said server and said client;
  c. said client sending a user command to said server to be applied to said master model and said synchronized model by said server;
  d. said client applying said sent user command to said predictive model and adding said sent command to a list of not-yet-acknowledged commands;
  e. said server receiving and applying said sent user command to said master model and said synchronized model and sending a positive acknowledgement thereof to said client to enable application of said acknowledged command to said synchronized model at said client;
  f. said client receiving said positive acknowledgement and applying said acknowledged command to said synchronous model and removing said acknowledged command from the not-yet-acknowledged list;
  g. said client receiving and applying said correction to said synchronized model to recompute said predictive model by copying the contents of said synchronized model to said predictive model;
  h. said client re-applying all remaining commands in said not-yet-acknowledged list to said predictive model.

2. The computer system of claim 1, wherein each model comprises the following data structures which are stored in memory resident on at least one said server and client which are manipulable by said system at said user's interactive command:
  a. descriptions of the environment;
  b. global state variables;
  c. user records;
  d. rules of the virtual environment contained in a script;
  e. a set of data for identifying a virtual object present in a region.

3. The computer system of claim 2, wherein each said object comprises the following data for enabling the location of identifying characteristics in said data structures:
  a. a position identifier;
  b. a type identifier;
  c. a graphics identifier;
  d. local state variables;
  e. lists of activities performed by a virtual object.

4. The computer system of claim 3, wherein said script includes plans, wherein each plan is a sequence of procedures that may perform the following functions:
  a. movement of virtual objects;
  b. changing the appearance of said virtual objects;
  c. execution of animated movement by said virtual objects;
  d. creating and destroying said virtual objects;
  e. interacting with said users;
  f. reporting status information to said users;
  g. changing the state variables of said virtual objects.

5. The computer system of claim 4, wherein said activities are implemented by the following elements:
  a. an array of p-codes;
  b. a program counter referring to said array;
  c. an array of registers;
  d. instruction suspension information.

6. The computer system of claim 5, wherein each procedure of said script is represented using the following items of information, which are part of said models:
  a. a set of input and output registers;
  b. instruction suspension information;
  c. an array of executable codes;
  d. an initial program counter;
  e. a set of initial values for registers;
  f. parameter information;
  g. a copy of original source code;
wherein said information is used to initialize said activities.

7. The computer system of claim 1 in which a component in said client program generates commands that cause the state of the system to automatically progress.

8. A method of providing for interaction between distributed users within a virtual environment and to minimize the perception of latency by said users, said method comprising:
  a. providing a server computer;
  b. providing a plurality of client computers;
  c. providing a communication network that enables said client computers to transmit information to said server computer and said server computer to transmit information to said client computers;
  d. running on said server computer a server program;
  e. running on each said client computer a client program;
  f. providing within said server program a master model that accurately represents the state of a virtual environment;
  g. providing within said client program one client-synchronous model that approximately represents the state of said virtual environment;
  h. providing within said client program one predictive model that approximately represents the state of said virtual environment;
  i. providing, within said server program, a number of server-synchronous models that approximately represent the state of said virtual environment, with one server-synchronous model per client computer;
  j. providing within said client program a list of not-yet-acknowledged commands;
  k. providing a means whereby said client-synchronous model, said server-synchronous model corresponding to said client computer, and said predictive model are placed into the same initial state;
  l. providing a means whereby the user of said client-computer can observe said virtual environment as represented by said predictive model;
  m. providing a means whereby the user of said client-computer can issue commands that manipulate the state of said virtual environment;
  n. said client program responding to the issuance of said command by said user by transmitting said command to said server program, updating said predictive model to reflect the effects of said command, and adding said command to said list of not-yet-acknowledged commands;

o. said server program responding to the receipt of a command from said client program by updating said master model to reflect the effects of said command, updating said server-synchronous model to reflect the effects of said command, and by transmitting to said client program an acknowledgement of said command;

p. said client program responding to the receipt from said server program of an acknowledgement of a command by updating said client-synchronous model to reflect the effects of said command, and removing said command from said list of not-yet-acknowledged commands;

q. said server program periodically compiling a list of corrections needed to make said server-synchronous model correspond more closely to said master model, applying said list of corrections to said server-synchronous model, and transmitting said list of corrections to said client computer corresponding to said server-synchronous model;

r. said client program responding to the receipt of a list of corrections by applying said list of corrections to said client-synchronous model, copying said client-synchronous model to said predictive model, and updating said predictive model to reflect the effects of each command in said list of not-yet-acknowledged commands.

9. The method of claim 8 in which the means whereby said client-synchronous model, said server-synchronous model corresponding to said client computer, and said predictive model are placed into the same initial state is to place all said models into a predefined empty state.

10. The method of claim 8 in which the means whereby said client-synchronous model, said server-synchronous model corresponding to said client computer, and said predictive model are placed into the same initial state is for said server program to select an initial state and to transmit said state to said client program.

11. The method of claim 8 in which a component in said client program generates commands that cause the state of the system to automatically progress.

12. The method of claim 8 in which said server program contains means to adjust the interval between which it compiles lists of corrections, and in which said server program contains means to detect that a correction is immediately desirable causing said server program to immediately reduce said interval.

13. The method of claim 8 in which the properties of the objects in the virtual environment are controlled by a description in a scripting language.

14. The method of claim 8 in which the properties of the objects in the virtual environment are controlled by a description in a scripting language, and in which said description is part of each said model.

15. The method of claim 8 in which certain corrections may be undo-corrections which instruct the receiver to undo the effects of the most-recently processed command.

16. The method of claim 8 in which certain corrections may be undo-corrections which instruct the receiver to undo the effects of the most-recently-processed command, and in which the server program may transmit an acknowledgement and an undo-correction together as a negative acknowledgement.

17. The method of claim 8 in which the means whereby the user may observe the virtual environment represented by the predictive model is to provide within said client program a display component that continuously renders said predictive model on a graphical display.

18. The method of claim 8 in which the means whereby the user of said client computer may issue commands that manipulate the state of said virtual environment is to provide within said client program a graphical user interface.

19. The method of claim 8 in which the communication network is the Internet.

20. The method of claim 8 in which the server computer is a conventional computer.

21. The method of claim 8 in which the server computer is a conventional supercomputer.

22. The method of claim 8 in which the server computer is a parallel supercomputer.

23. The method of claim 8 in which the server computer is a distributed-memory parallel supercomputer consisting of a network of conventional workstations.

24. The method of claim 8 in which certain messages are combined together and transmitted as a group in order to reduce transmission costs.

25. The method of claim 8 in which acknowledgements are combined with other transmissions in order to encode said acknowledgements more efficiently.

26. The system of claim 1, wherein said system comprises at least one set of computer-coded instructions stored on at least one computer-readable storage medium located on at least one said server or client which are executed by at least one computer processor located on said server or client to perform operations to accomplish information processing on computer-readable data to be stored within a plurality of memory locations comprising at least one other computer-readable storage medium located on at least one said server or client.

* * * * *